United States Patent
Ito et al.

(10) Patent No.: US 8,652,272 B2
(45) Date of Patent: Feb. 18, 2014

(54) SUPPRESSION METHOD FOR CORROSION OF CARBON STEEL MEMBER

(71) Applicant: Hitachi-GE Nuclear Energy, Ltd., Hitachi (JP)

(72) Inventors: Tsuyoshi Ito, Hitachi (JP); Hideyuki Hosokawa, Hitachinaka (JP); Yukio Hirama, Mito (JP); Motoaki Sakashita, Hitachi (JP); Makoto Nagase, Mito (JP)

(73) Assignee: Hitachi-GE Nuclear Energy, Ltd., Hitachinaka-shi (JP)

( * ) Notice: Subject to any disclaimer, the term of this patent is extended or adjusted under 35 U.S.C. 154(b) by 0 days.

(21) Appl. No.: 13/746,907

(22) Filed: Jan. 22, 2013

(65) Prior Publication Data
US 2013/0202791 A1    Aug. 8, 2013

Related U.S. Application Data

(62) Division of application No. 12/849,484, filed on Aug. 3, 2010.

(30) Foreign Application Priority Data

Aug. 4, 2009    (JP) .................................. 2009-181310

(51) Int. Cl.
G21C 15/00    (2006.01)
C23C 8/18    (2006.01)
G21C 9/00    (2006.01)

(52) U.S. Cl.
USPC ........... 148/287; 148/284; 148/286; 376/305; 376/306

(58) Field of Classification Search
USPC .................. 148/284, 286, 287; 376/305, 306
See application file for complete search history.

(56) References Cited

U.S. PATENT DOCUMENTS

2006/0067455 A1    3/2006    Hosokawa et al.
2009/0003507 A1    1/2009    Nagase et al.
2009/0290675 A1    11/2009    Nagase et al.

FOREIGN PATENT DOCUMENTS

| JP | 2000-292589 A | 10/2000 |
|----|---------------|---------|
| JP | 2006-38483 A  | 2/2006  |
| JP | 2007-24644 A  | 2/2007  |
| JP | 2007-182604 A | 7/2007  |
| JP | 2007-192672 A | 8/2007  |
| JP | 2008-180740 A | 8/2008  |
| JP | 2008-209418 A | 9/2008  |

OTHER PUBLICATIONS

Masanori Abe, "Synthesis of ferrite thin films and ultrafine particles by low-temperature (3 to 90° C) aqueous solution process", 2001, pp. 342-349, vol. 75, No. 8.

Masanori Abe et al., "Ferrite plating in aqueous solution: New technique for preparing magnetic thin film", J. Appl. Phys., Mar. 15, 1984, pp. 2614-2616, vol. 55, No. 6.

Nobuhiro Matsushita et al., "Fe/Ferrite Composite Magnetic Cores Far Exceeding Snoek's Limit Fabricated by Simplified Ferrite Plating in Open Air", IEEE Transactions on Magnetics, Jul. 2004, pp. 1-3, vol. 40, No. 4.

*Primary Examiner* — Lois Zheng
(74) *Attorney, Agent, or Firm* — Crowell & Moring LLP

(57) ABSTRACT

A bath containing nickel ions and formic acid is injected into a film-forming aqueous solution flowing in a circulation pipe connected to a feed water pipe made of carbon steel in a BWR plant. This solution is supplied into the pipe through the circulation pipe, and a nickel metal film is formed on an inner surface of the pipe. After the film is formed, a film-forming aqueous solution containing iron (II) ions, formic acid, nickel ions, hydrogen peroxide, and hydrazine is supplied to the pipe. A nickel ferrite film is formed on the surface of the nickel metal film in the pipe. The nickel ferrite film comes into contact with water containing dissolved oxygen at or above 150° C. to transform the nickel metal film into a nickel ferrite film. A thick nickel ferrite film is formed on the inner surface of the feed water pipe.

7 Claims, 9 Drawing Sheets

SUPPRESSION METHOD FOR CORROSION OF CARBON STEEL MEMBER

CROSS-REFERENCE TO RELATED APPLICATIONS

This application is a divisional of U.S. application Ser. No. 12/849,484 filed Aug. 3, 2010, and claims priority from Japanese Patent application serial no. 2009-181310, filed on Aug. 4, 2009, the contents of which are hereby incorporated by reference into this application.

BACKGROUND OF THE INVENTION

1. Technical Field

The present invention relates to a suppression method for corrosion of a carbon steel member and more particularly, to a suppression method for corrosion of a carbon steel member, suitable for a nuclear power plant.

2. Background Art

A boiling water reactor plant (hereinafter referred to as a BWR plant) and a pressurized-water reactor plant (hereinafter referred to as a PWR plant), for example, are known as power plants. The BWR plant, for example, has a nuclear reactor disposing a core in a reactor pressure vessel (hereinafter referred to as a RPV). Cooling water supplied to the core by a recirculation pump (or an internal pump) is heated using the heat generated by nuclear fission of nuclear fuel material in fuel assemblies loaded in the core, and part of the cooling water turns into steam. This steam is introduced to a turbine from the reactor to drive the turbine. A generator coupled to the turbine rotates to generate power. The steam exhausted from the turbine is condensed by a condenser and turns into water. This water is supplied to the reactor as feed water. In order to suppress radioactive corrosion products from being generated in the reactor, a demineralizer is provided to a feed water pipe to remove mainly metallic impurities from the feed water.

In a power plant such as the BWR and PWR plants, stainless steel and nickel base alloy are used for a wetted surface of main structure members such as a reactor pressure vessel, to suppress corrosion. However, in some structure member such as a reactor coolant clean-up system, a residual heat removal system, a reactor core isolation cooling system, a core spray system, and a feed water system, the structure members made of carbon steel are mainly used to reduce construction cost of the plant or to avoid stress corrosion cracking of stainless steel caused by high-temperature water flowing in the feed water system, etc.

Unfortunately, the carbon steel members composing the reactor coolant clean-up system, the residual heat removal system, the reactor core isolation cooling system, the core spray system, and the feed water system, also have a wetted surface come into contact with water, and this wetted surface may corrode. In this case, if the carbon steel member is disposed downstream of a clean-up apparatus, corrosion products from the carbon steel member may cause radioactive corrosion products in the reactor. Furthermore, the corrosion products from the carbon steel member may decrease the heat-transfer efficiency of a secondary system in a PWR plant.

In order to suppress corrosion of a carbon steel member composing a plant, some methods have been proposed such as, for example, a method for forming an oxide film on a surface of the carbon steel member by injecting oxygen in a feed water system of the plant, and a method of adding chemicals such as ammonia ($NH_3$) and hydrazine ($N_2H_4$) in a feed water system of the plant to obtain alkaline pH (see Japanese Patent Laid-open No. 2000-292589, for example).

In the conventional method of injecting oxygen in feed water of the plant, however, the oxygen needs to be continuously injected during the operation of the plant since the effect of corrosion control cannot be obtained when the oxygen injection is stopped. Moreover, in view of suppressing corrosion in the plant, the method is against a recent preference of keeping the reactor in a reducing environment.

In the conventional method of adding chemicals in feed water of the plant to obtain alkaline pH, described in Japanese Patent Laid-open No. 2000-292589, the chemicals need to be continuously added during the operation of the plant in the same way. Moreover, the added chemicals increase burdens on a condensate clean-up apparatus, a clean-up apparatus for a reactor clean-up system, and so on, which may cause the amount of waste from the clean-up apparatuses to be increased.

To solve these problems, a method for forming a closely-packed ferrite film (for example, a magnetite [$Fe_3O_4$] film or a nickel ferrite [$NiFe_2O_4$] film) on a surface of a carbon steel member in a BWR plant, for example, has been proposed (see Japanese Patent Laid-open No. 2007-182604, for example). In this proposal, a film-forming aqueous solution including a first agent containing iron (II) ions, a second agent containing nickel ions, a third agent (oxidizing agent) for oxidizing the iron (II) ions into iron (III) ions, and a fourth agent (a pH adjustment agent) for adjusting pH is used for forming a nickel ferrite film. The ferrite film serves as a protection film for blocking cooling water from contacting the carbon steel member, so that the surface of the carbon steel member come into contact with the cooling water is suppressed from corrosion.

In addition, a method for forming a ferrite film on the inner surface of a recirculation pipe made of stainless steel in a BWR plant is disclosed in Japanese Patent Laid-open No. 2006-38483.

PRIOR ART LITERATURES

Patent Literatures

Patent Literature 1: Japanese Patent Laid-open No. 2000-292589

Patent Literature 2: Japanese Patent Laid-open No. 2007-182604

Patent Literature 3: Japanese Patent Laid-open No. 2006-38483

SUMMARY OF THE INVENTION

Technical Problem

In the method for suppressing corrosion of carbon steel by forming a closely-packed nickel ferrite film on a surface of a carbon steel member in a nuclear power plant, described in Japanese Patent Laid-open No. 2007-182604, corrosion is suppressed by forming a nickel ferrite film to block contact between the carbon steel and water.

The inventors have studied the method for suppressing corrosion of the carbon steel member, described in Japanese Patent Laid-open No. 2007-182604, and have found out a method for further improving the effect of corrosion protection.

An object of the present invention is to provide a suppression method for corrosion of a carbon steel member, which can further suppress corrosion of the carbon steel member composing a plant.

Solution to Problem

The present invention to achieve the above object is characterized in that a nickel metal film is formed on a wetted surface of a carbon steel member composing a plant, a nickel ferrite film is formed on the surface of the nickel metal film formed, and then, the nickel metal film is transformed into a nickel ferrite film.

By transforming the nickel metal film between the surface of the carbon steel member and the nickel ferrite film into a nickel ferrite film, the thickness of the nickel ferrite film, which is more closely-packed than the nickel metal film, is increased. Because of this, corrosion of the carbon steel member in high temperature can be further suppressed.

The surface of the nickel ferrite film covering the nickel metal film is preferably come into contact with oxygen-dissolved water at 150° C. or above. By exposing the surface of the nickel ferrite film to the water, oxygen ions in the water can diffuse into the nickel ferrite film to reach the nickel metal film. Iron ions also diffuse from the carbon steel member into the nickel metal film. Consequently, the iron ions, the oxygen ions, and nickels in the nickel metal film react, and then, nickel ferrite is produced. In this way, the nickel metal film is transformed into a nickel ferrite film.

Advantageous Effect of the Invention

According to the present invention, corrosion of a carbon steel member composing a plant can be further suppressed.

DETAILED DESCRIPTION OF THE PREFERRED EMBODIMENTS

Figure 1:
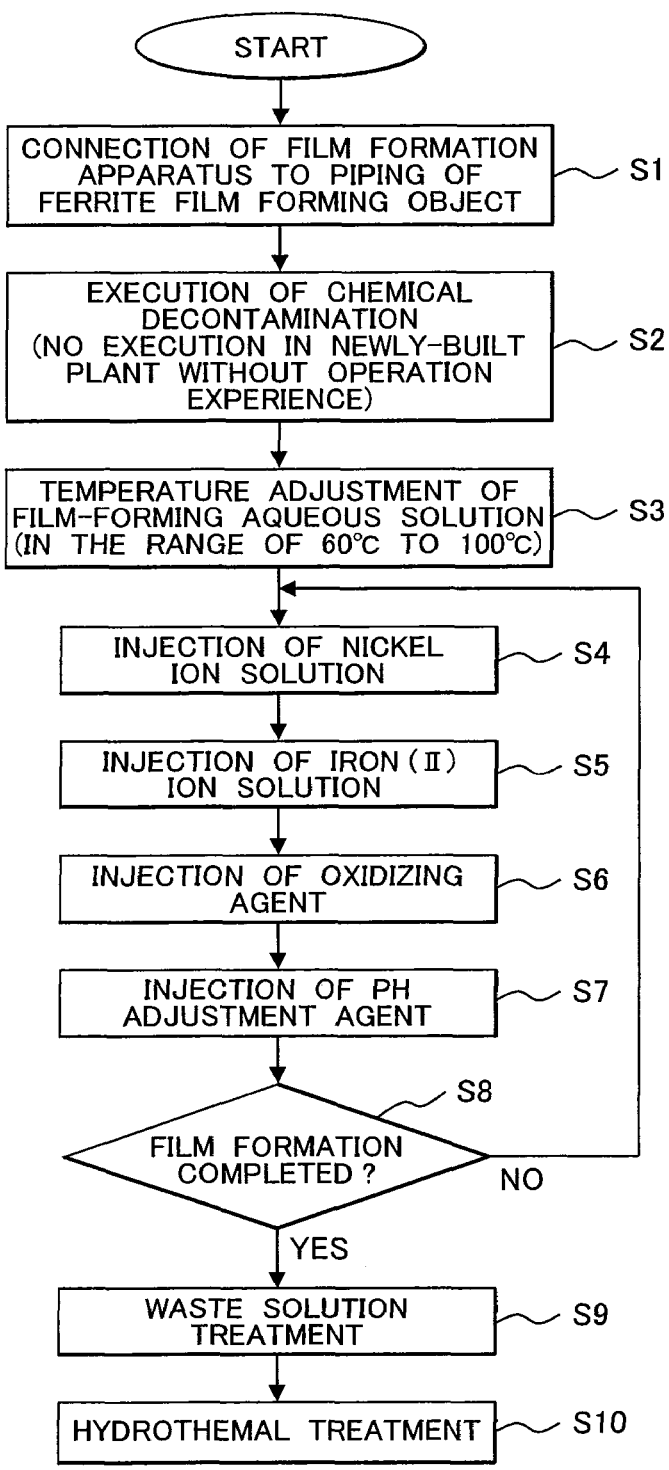
FIG. 1 is a flowchart showing procedure being carried out in a suppression method for corrosion of a carbon steel member according to Embodiment 1 which is a preferred embodiment of the present invention, applied to a feed water pipe in a BWR plant.

The inventors have done a detailed study and experiments to further enhance effect of a suppression method for corrosion of a carbon steel member, disclosed in Japanese Patent Laid-open No. 2007-182604. In Japanese Patent Laid-open No. 2007-182604, a single layer of nickel ferrite film is formed on a surface of a carbon steel member. A result of the study has led the inventors to finally conclude that the effect of corrosion protection can be further enhanced by increasing the thickness of the nickel ferrite film.

In the suppression method for corrosion of a carbon steel member, described in Japanese Patent Laid-open No. 2007-182604, a nickel ferrite film blocks contact between the carbon steel member and water. However, it has become clear that, even for the carbon steel member whose surface is covered by the nickel ferrite film, when the nickel ferrite film formed is come into contact with high-temperature water, oxygen ions contained in the high-temperature water diffuse into the nickel ferrite film and then react with the carbon steel member, which is the base material, and at the same time, the base material is dissolved such that iron ions dissolved out from the carbon steel member diffuse into the nickel ferrite film. The inventors, thus, have studied a way to suppress the oxygen ions and iron ions from diffusing into the nickel ferrite film exposed to high-temperature water. As a result, the inventors have devised a method shown below.

That is to form a nickel metal film on a surface of a carbon steel member, to form a nickel ferrite film on the surface of the nickel metal film, and then, to transform the nickel metal film into a nickel ferrite film. The transformation of the nickel metal film into the nickel ferrite film can be achieved, for example, by exposing the nickel ferrite film formed on the surface of the nickel metal film to oxygen-dissolved water at 150° C. or above (high-temperature water).

Nickel metal contained in the nickel metal film that is present between the nickel ferrite film and the carbon steel member react with oxygen ions diffused from the high temperature water and iron ions diffused from the base material. This prevents reaction between the oxygen ions and the carbon steel member, which is the base material, and prevents dissolution of the iron ions from the base material. Furthermore, the nickel metal contained in the nickel metal film formed reacts with both the iron ions diffused from the base material and the oxygen ions diffused from the high-temperature water to turn the nickel metal film into the nickel ferrite film. Thus, by exposing a double-layer nickel ferrite-nickel metal film to high-temperature water, a corrosion protection film thicker than that obtained by the suppression method for corrosion of a carbon steel member, disclosed in Japanese Patent Laid-open No. 2007-182604, can be formed on the surface of the carbon steel member.

A method for forming the single-layer nickel ferrite film and a method for forming the double-layer nickel ferrite-nickel metal film on the surface of the carbon steel member are specifically explained.

In the method for forming a single-layer nickel ferrite film, disclosed in Japanese Patent Laid-open No. 2007-182604, a wetted surface of a carbon steel member, which is a component of a plant, is come into contact with a film-forming solution including a first agent containing iron (II) ions and acid, a second agent containing nickel ions, and a third agent for oxidizing the iron (II) ions into iron (III) ions, whose pH is adjusted to a value in a range between 5.5 and 9.0 by using a fourth agent for adjusting the pH, to form a nickel ferrite film on the surface of the carbon steel member. The above film forming method disclosed in Japanese Patent Laid-open No. 2007-182604 is referred to as a method A for convenience.

In the method of forming a double-layer nickel metal-nickel ferrite film on a surface of a carbon steel member, a first film-forming solution containing nickel ions, whose pH is adjusted to a value in a range between 4.0 and 9.0, and a second film-forming solution including a first agent containing iron (II) ions, a second agent containing nickel ions, and a third agent for oxidizing the iron (II) ions, whose pH is adjusted to a value in a range between 5.5 and 9.0 are used. First, a wetted surface of the carbon steel member, which is the component of the plant, is come into contact with the first film-forming solution to form a nickel metal film on the surface. Then, the surface of the nickel metal film formed is come into contact with the second film-forming solution to form a nickel ferrite film on the surface of the nickel metal film.

After the double-layer nickel metal-nickel ferrite film is formed on the surface of the carbon steel member in this way, the nickel ferrite film is come into contact with oxygen-dissolved water at 150° C. or above. Eventually, as described above, the nickel metal reacts with oxygen ions and iron ions to turn into nickel ferrite, and the nickel metal film turns into a nickel ferrite film. Thus, in addition to the initial nickel ferrite film, a thicker nickel ferrite film is formed on the surface of the carbon steel member.

The above method of forming the double-layer film is referred to as method B for convenience. The principle of forming the double-layer film on the surface of the carbon steel member is explained briefly. Nickel ions have a lower ionization tendency than iron ions contained in the carbon steel member. For this reason, when nickel ions exist on the surface of the carbon steel member, the nickel ions are reduced according to Equation (1), and then, nickel metal is produced on the surface of the carbon steel member. After this nickel metal has grown to be a film on the surface of the carbon steel member, a nickel ferrite film may be formed on the surface of the nickel metal film. The nickel metal film formed on the surface of the carbon steel member, here, serves as a corrosion protection film for the carbon steel member along with the nickel ferrite film.

$$Fe + Ni^{2+} \rightarrow Fe^{2+} + Ni \quad (1)$$

After the nickel ions are formed on the surface of the carbon steel member, nickel ions and Fe ions are absorbed on the surface of the nickel metal film, and by the action of oxidation chemicals and a pH adjustment agent, a nickel ferrite film is formed according to Equation (2).

$$Ni^{2+} + 2Fe^{3+} + 4H_2O \rightarrow NiFe_2O_4 + 8H^+ \quad (2)$$

As a result of the above study, the inventors have thought that the second agent should be added to water when the nickel metal film is to be formed on the surface of the carbon steel member according to Equation (1), and the first, second, third, and fourth agents should be added to water when the nickel ferrite film is to be formed on the surface of the nickel metal film according to Equation (2). Since nickel ions have a lower ionization tendency than iron ions, the first agent may be added to water along with the second agent when the nickel metal film is formed. When nickel ions and iron ions are contained in the aqueous solution contacting the surface of the carbon steel member, the nickel ions adhere to the surface of the carbon steel member before the iron ions. When the nickel ferrite film is formed, the second agent may be added before adding the first agent or simultaneously with the first agent. The third and fourth agents may be added anytime as long as it is after the second agent has been added.

Figure 4:
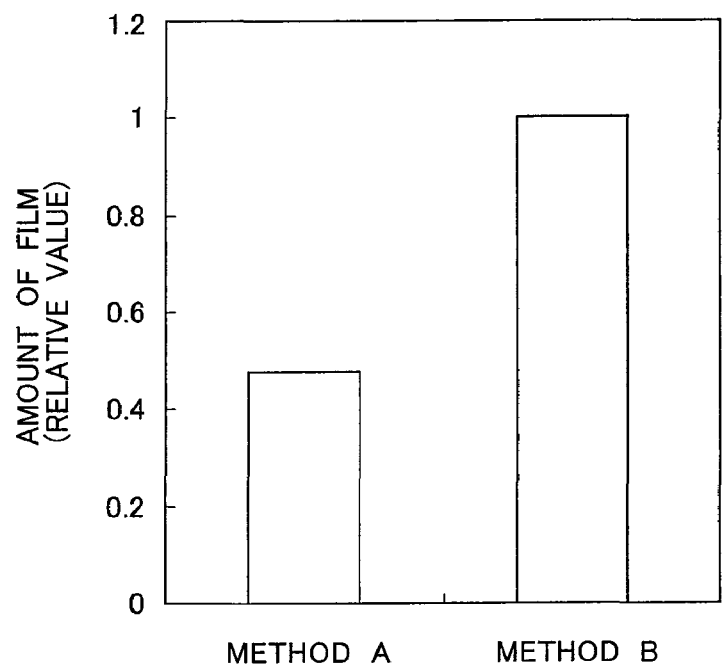
FIG. 4 is an explanatory drawing showing a difference in the amounts of nickel ferrite films formed by two different methods for forming a nickel ferrite film on a surface of a carbon steel member.

FIG. 4 shows the amount (thickness) of film formed on the surface of the carbon steel member by the methods A and B when the time for forming the nickel ferrite film in the method A and the time for forming the double-layer film in the method B are made equal. In FIG. 4, the amount of film formed by method A is the amount (thickness) of the nickel ferrite film, and the amount (thickness) of film formed by method B is a sum of each amount (thickness) of the nickel metal film and the nickel ferrite film. The amount (thickness) of the double-layer film formed on the surface of the carbon steel member by method B is approximately twice the amount (thickness) of the nickel ferrite film formed by the method A. This shows that the suppression effect of the corrosion on the carbon steel member by the double-layer film (the nickel metal film and the nickel ferrite film) formed on the surface of the carbon steel member in the method B is greater than the suppression effect of the corrosion on the carbon steel member by the nickel ferrite film formed in the method A.

Figure 5:
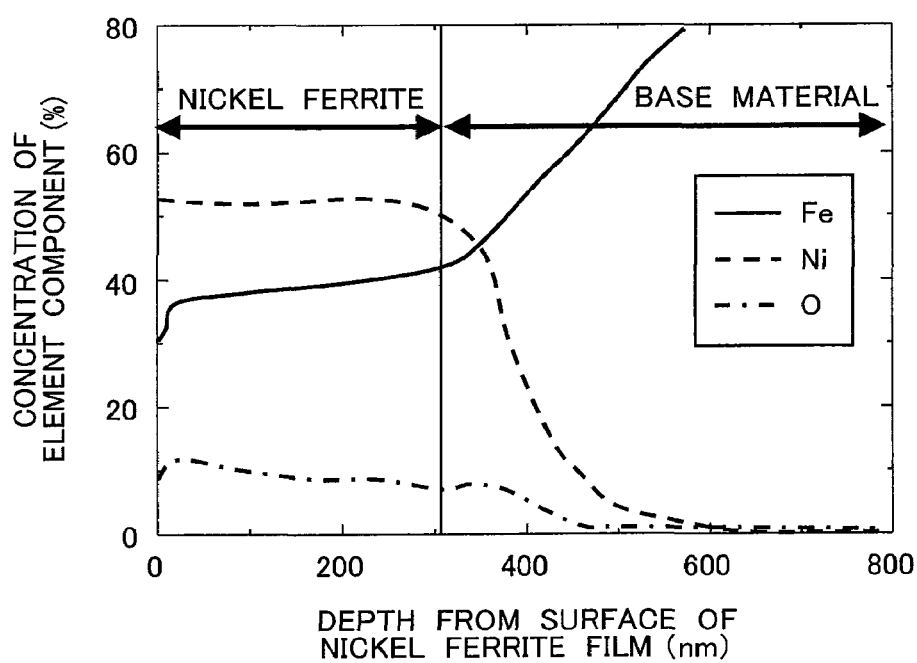
FIG. 5 is an explanatory drawing showing a change, which is a result obtained by analyzing using Auger spectroscopy, a film formed by a method A shown in FIG. 4, in the concentration of element component in the depth direction from a surface of a nickel ferrite film.
Figure 6:
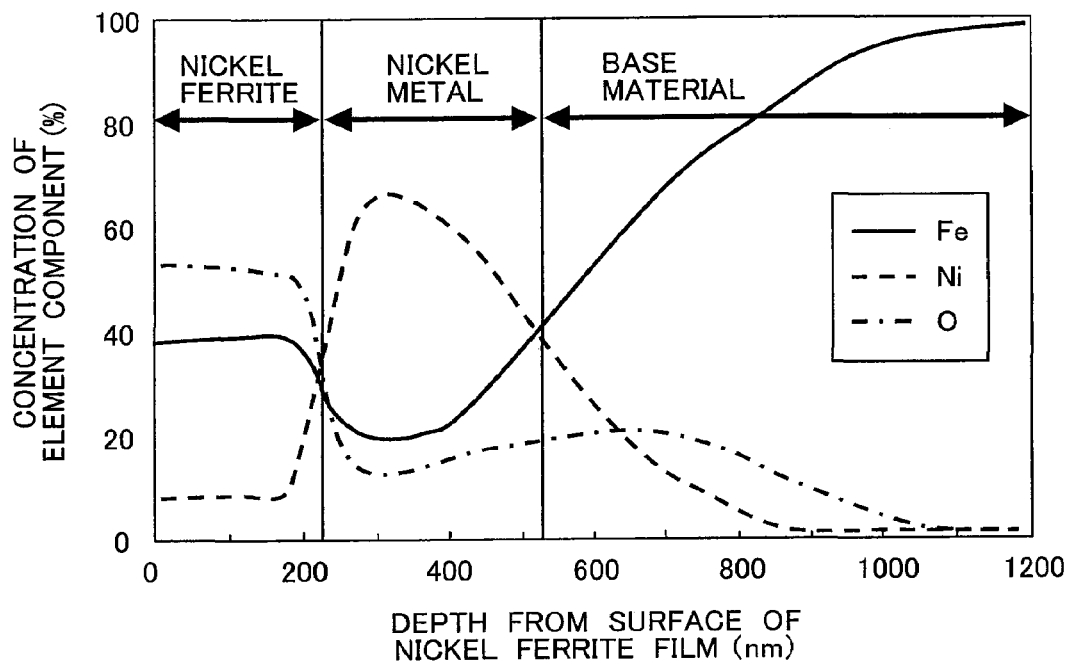
FIG. 6 is an explanatory drawing showing a change, which is a result obtained by analyzing, using Auger spectroscopy, a film formed by a method B shown in FIG. 4, in the concentration of element component in the depth direction from a surface of a nickel ferrite film.

The inventors have analyzed, using Auger spectroscopy, a composition in the thickness direction of the nickel ferrite film formed on the surface of the carbon steel member in the method A, and a composition in the thickness direction of the double-layer film formed on the surface of the carbon steel member in the method B. The results are shown in FIGS. 5 and 6. In FIGS. 5 and 6, the vertical axis shows the concentration of element components in the film(s) and the base material, and the horizontal axis shows a depth from the surface of the nickel ferrite film.

The film formed on the surface of the carbon steel member in the method A is, as shown in FIG. 5, a uniform single-layer nickel ferrite film. A result of the Auger spectroscopy of the double-layer film formed on the surface of the carbon steel member in the method B is shown in FIG. 6. This analysis result has confirmed that the portion near the surface is the nickel ferrite film and the layer between the nickel ferrite film and the base material (the carbon steel member) is the nickel metal film.

The inventors have conducted a corrosion test of the carbon steel member to check the suppression effect of the corrosion of each film formed in the methods A and B. Three kinds of test pieces were prepared for this corrosion test. These test pieces are a test piece A, in which a nickel ferrite film has been formed on the surface of a carbon steel member in the method A, a test piece B, in which a double-layer film has been formed on the surface of a carbon steel member in the method B, and a test piece C, in which the surface of a carbon steel member has been polished. The test piece C is a reference test piece.

Figure 7:
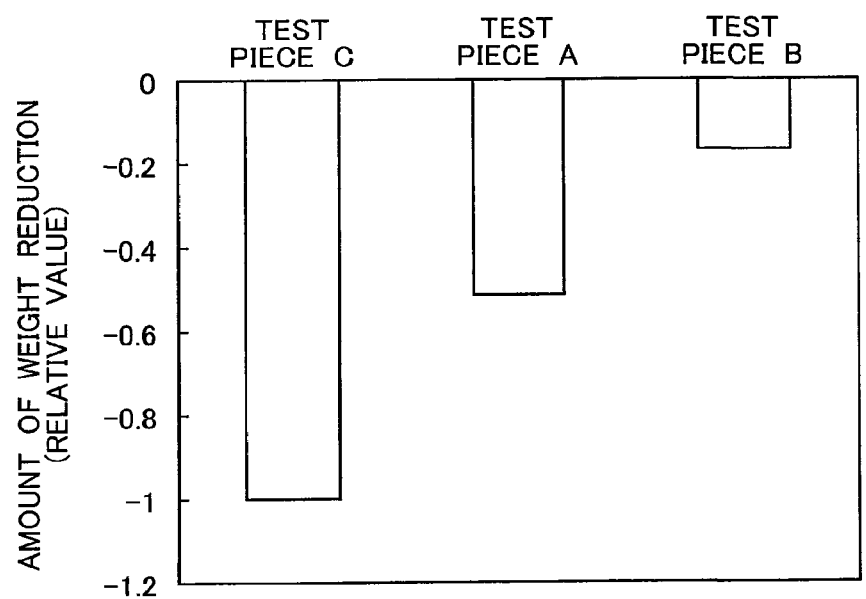
FIG. 7 is an explanatory drawing showing suppression effect of corrosion on a carbon steel member on surface of which a nickel ferrite film is formed, when the member is immersed in high-temperature oxygen-dissolved water.

In the corrosion test, the inventors have immersed these test pieces into water containing 20 ppm of dissolved oxygen at a temperature of 150° C. for 500 hours. A result of this corrosion test is shown in FIG. 7. The amount of corrosion of the carbon steel member of the test piece A is approximately 50% less than that of the carbon steel member of the test piece C. The amount of corrosion of the carbon steel member of the test piece B is approximately 90% less than that of the carbon steel member of the test piece C. This has shown that the suppression effect of the corrosion of the double-layer film formed in the method B is more than the suppression effect of the corrosion of the nickel ferrite film formed in the method A.

Figure 8:
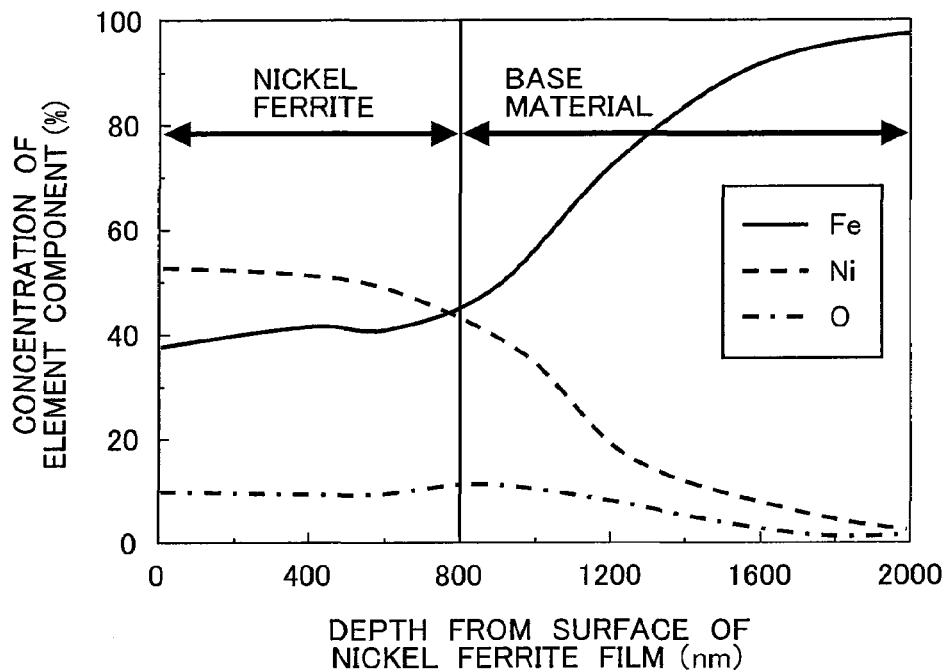
FIG. 8 is an explanatory drawing showing a change, which is a result obtained by analyzing, using Auger spectroscopy, a film formed on the test piece B shown in FIG. 7 after a corrosion test, in the concentration of element components in the depth direction from the surface of the nickel ferrite film.

After the corrosion test, the inventors have analyzed, by Auger spectroscopy, the test piece B used in the corrosion test. A result of this analysis is shown in FIG. 8. The nickel metal film found between the nickel ferrite film and the carbon steel member (the base material) on the test piece B before the corrosion test (see FIG. 6) has been transformed into a nickel ferrite layer. This is believed to be because, as described above, in a high temperature of 150° C., iron ions dissolved out of the base material and oxygen ions contained in the water have reacted with nickel metal. When the entire nickel metal film has turned into a nickel ferrite, the thickness of the nickel ferrite film formed on the test piece B was 800 nm, which was about 2.5 times the thickness of the nickel ferrite film formed in the method A. The thickness of the nickel ferrite film formed on the test piece B is more than the total thickness (approximately 520 nm) of the double-layer film shown in FIG. 6. The reason for this is explained below. When the nickel metal has transformed into the nickel ferrite, the nickel whose concentration had peaked in a region around 300 nm from the surface of the nickel ferrite film was evenly spread in a range between 0 to 800 nm from the surface of the nickel ferrite film, which caused the thickness of the nickel ferrite film formed on the test piece B to be more than the total thickness of the double-layer film shown in FIG. 6.

By exposing the surface of the nickel ferrite film of the double-layer film formed in the method B to high-temperature oxygen-dissolved water at 150° C., the entire nickel metal film has transformed into a nickel ferrite film; thereby, corrosion of the carbon steel member has been significantly reduced even under a high temperature of 150° C.

Based on the results in FIGS. 7 and 8, the inventors have found out a way to form a nickel metal film on a surface of a carbon steel member, to form a nickel ferrite film on the surface of the nickel metal film, and then, to turn the nickel metal film into nickel ferrite to form a single-layer nickel ferrite film on the surface of the carbon steel member.

Various embodiments of the present invention, reflecting the above study results are described below.

Embodiment 1

Figure 2:
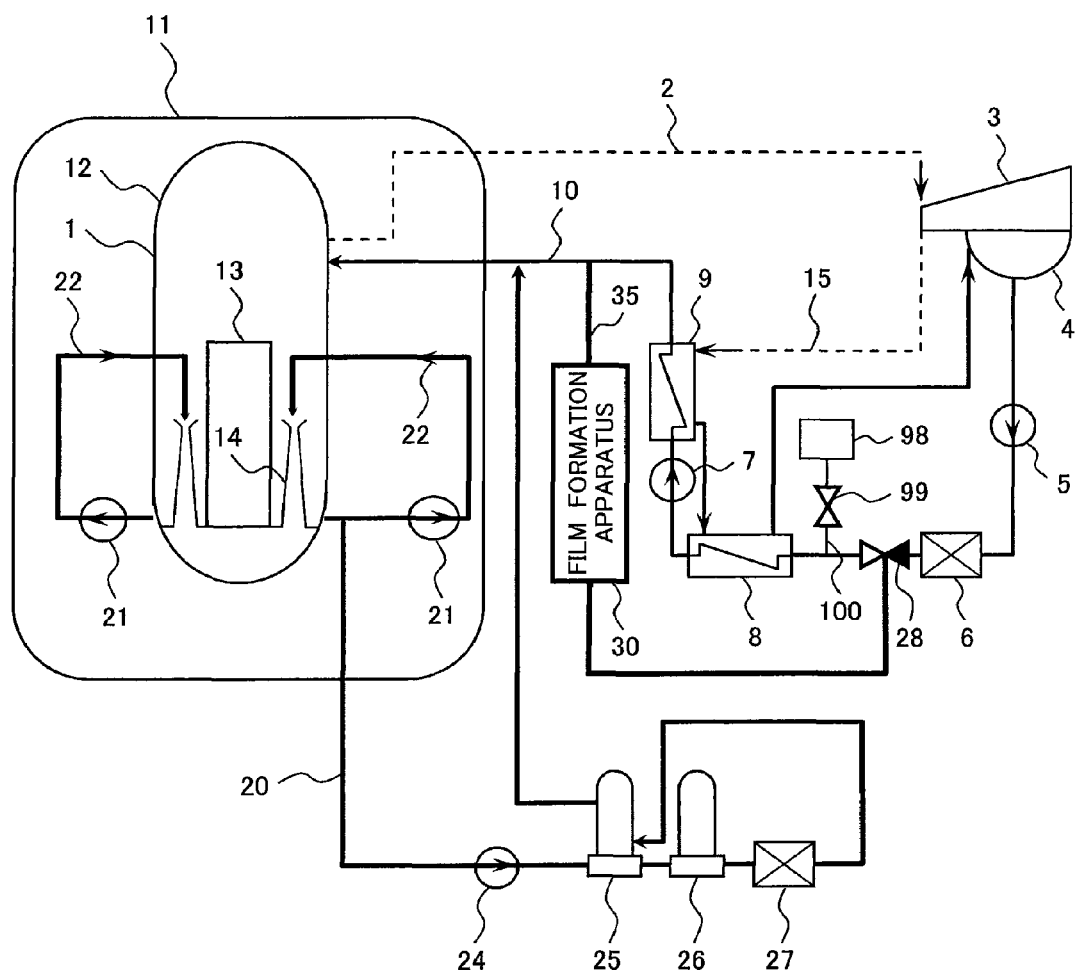
FIG. 2 is an explanatory drawing showing a status in which a film formation apparatus used in a suppression method for corrosion of a carbon steel member shown in FIG. 1, is connected to a feed water pipe in a BWR plant.
Figure 3:
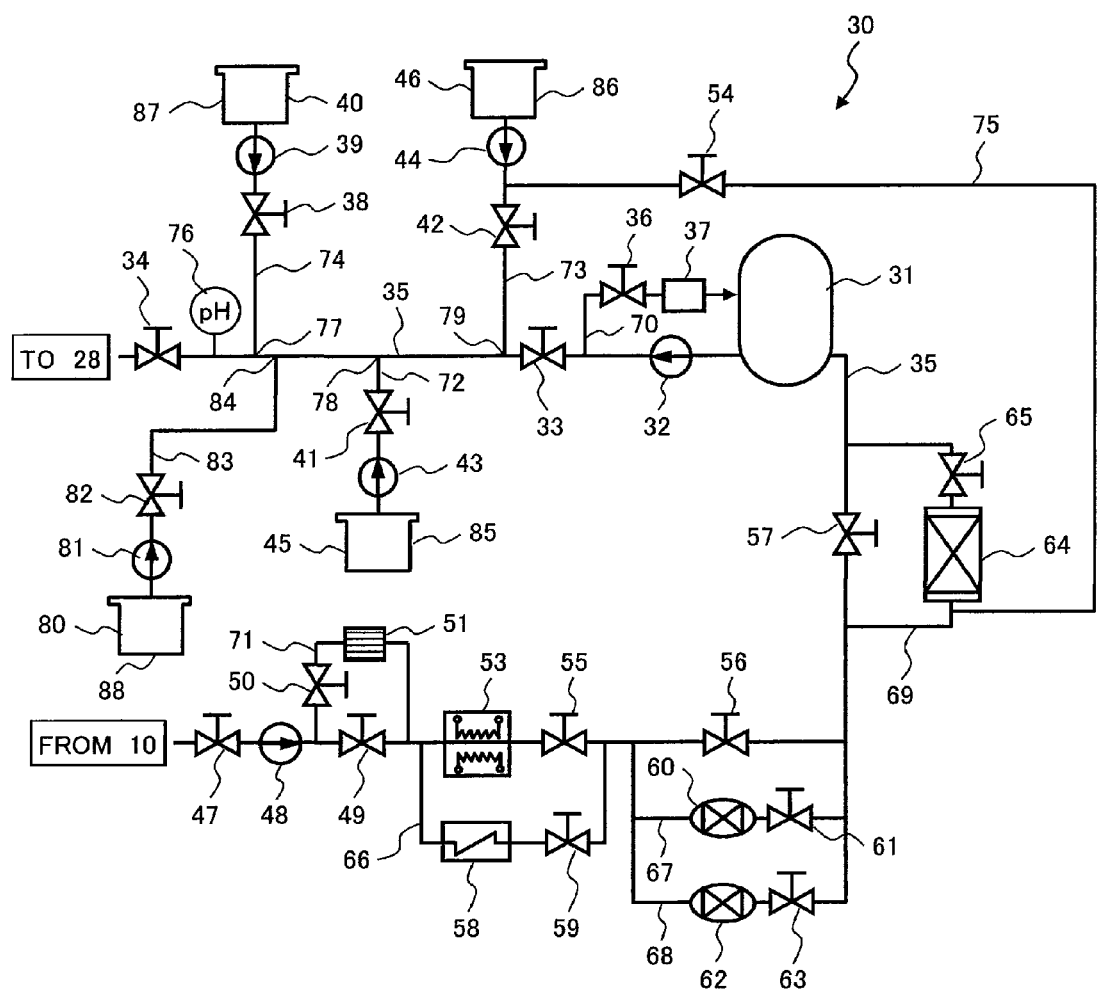
FIG. 3 is a detailed structural diagram showing the film formation apparatus shown in FIG. 2.

A suppression method for corrosion of a carbon steel member according to embodiment 1 which is a preferred embodiment of the present invention, applied to a feed water pipe in a BWR plant, is described with reference to FIGS. 1, 2, and 3.

A BWR plant, which is a nuclear power plant, is provided with a nuclear reactor 1, a turbine 3, a condenser 4, a recirculation system, a reactor clean-up system, and a feed water system. The reactor 1 has a reactor pressure vessel (hereinafter referred to as an RPV) 12 and a core 13 disposed in the RPV 12, and jet pumps 14 are installed in the RPV 12. A plurality of fuel assemblies (not shown) are loaded in the core 13. The fuel assembly includes a plurality of fuel rods filled with a plurality of fuel pellets made from nuclear fuel material.

The recirculation system has a recirculation pipe 22 and a recirculation pump 21 installed to the recirculation pipe 22. One end of the recirculation pipe 22 is connected to the RPV 12, and the other end of the recirculation pipe 22 is communicated to a nozzle (not shown) of the jet pump 14. In the feed water system, a condensate pump 5, a condensate clean-up apparatus (for example, a condensate demineralizer) 6, a low pressure feed water heater 8, a feed water pump 7, and a high pressure feed water heater 9 are installed to a feed water pipe 10, which communicates between the condenser 4 and the RPV 12, in this order from the condenser 4 to the RPV 12. In addition, an oxygen supply apparatus 98 is connected to the feed water pipe 10 between the condensate clean-up system 6 and the low pressure feed water heater 8 through an oxygen supply pipe 100 provided with an open/close valve 99. In the reactor clean-up system, a clean-up pump 24, a regenerative heat exchanger 25, a non-regenerative heat exchanger 26, and a reactor water clean-up apparatus 27 are installed in this order to a clean-up pipe 20 communicating between the recirculation pipe 22 and the feed water pipe 10. The clean-up pipe 20 is connected to the recirculation pipe 22 upstream of the recirculation pump 21. The reactor 1 is installed in a reactor containment vessel 11 disposed in a reactor building (not shown).

Cooling water in the RPV 12 is pressurized by the recirculation pump 21, and ejected into the jet pump 14 through the recirculation pipe 22. Cooling water around the nozzle of the jet pump 14 is also sucked into the jet pump 14 to be supplied to the core 13. The cooling water supplied to the core 13 is heated by the heat generated by nuclear fission of the nuclear fuel material in the fuel rods. Part of the heated cooling water turns into steam. This steam is introduced to the turbine 3 from the RPV 12 through a main steam pipe 2 to rotate the turbine 3. A power generator (not shown) coupled to the turbine 3 rotates to generate power. The steam exhausted from the turbine 3 is condensed by the condenser 4 and turns into water. This water is supplied to the RPV 12 through the feed water pipe 10 as feed water. The feed water flowing in the feed water pipe 10 is pressurized by the condensate pump 5, impurities are removed from the feed water by the condensate clean-up apparatus 6, and the feed water is further pressurized by the feed water pump 7. The feed water is heated by the low pressure feed water heater 8 and the high pressure feed water heater 9 and introduced into the RPV 12. Extraction steam extracted from the turbine 3 is supplied to each of the low pressure feed water heater 8 and the high pressure feed water heater 9 through an extraction pipe 15, as a heat source for the feed water.

Part of the cooling water flowing in the recirculation pipe 22 is introduced into the clean-up pipe 20 of the reactor clean-up system by operation of the clean-up pump 24, and after being cooled by the regenerative heat exchanger 25 and the non-regenerative heat exchanger 26, it is cleaned up by the reactor water clean-up apparatus 27. The cleaned cooling water is heated by the regenerative heat exchanger 25 and returned to the RPV 12 through the clean-up pipe 20 and the feed water pipe 10.

After operation of the BWR plant is shut down, and while the operation of the BWR plant is being shut down, both ends of a circulation pipe (a film forming solution pipe) 35 of a film formation apparatus 30, which is temporary equipment, are connected to the feed water pipe (a carbon steel member) 10 made of carbon steel. This operation of connecting the circulation pipe 35 to the feed water pipe 10 is specifically explained. After the operation of the BWR plant is shut down, for example, a bonnet of a valve 28 installed to an outlet of the condensate clean-up apparatus 6 is opened, and the condensate clean-up apparatus 6 side of the valve 28 is closed. One end of the circulation pipe 35 of the film formation apparatus 30 is connected to a flange of the valve 28. As a result of this, the one end of the circulation pipe 35 is connected to the feed water pipe 10 upstream of the low pressure feed water heater 8. At the same time, a branch pipe (for example, a drain pipe or a sampling pipe) connected to the feed water pipe 10 downstream of the high pressure feed water heater 9 is disconnected at the flange portion, and the other end of the circulation pipe 35 is connected to the flange of the branch pipe in the feed water pipe 10 side. By connecting the circulation pipe 35 to the feed water pipe 10, a closed loop including the circulation pipe 35 and the feed water pipe 10 is formed. The film formation apparatus 30 is removed from the feed water pipe 10 after a nickel ferrite film is formed on the inner surface of the feed water pipe 10 and treatment of a solution used for forming the nickel ferrite film is completed, and while the operation of the BWR plant is still being shut down. Then, the operation of the BWR plant is started.

The film formation apparatus 30 is used both for forming the nickel metal film and the nickel ferrite film on the inner surface of the feed water pipe 10 and for treating the solution used for the film formation. Furthermore, the film formation apparatus 30 is also used for chemical decontamination of the inner surface of the feed water pipe 10. The film formation apparatus 30 connected to the feed water pipe 10 is disposed in a turbine building (not shown), which is a radiation management zone in the BWR plant.

A detailed structure of the film formation apparatus 30 is described with reference to FIG. 3. The film formation apparatus 30 is provided with a surge tank 31, the circulation pipe 35, an iron (II) ion injection apparatus 85, an oxidizing agent injection apparatus 86, a pH adjustment agent injection apparatus 87, a nickel ion injection apparatus 88, a filter 51, a decomposition apparatus 64, and a cation exchange resin tower 60.

An open/close valve 47, a circulation pump 48, a valve 49, a heater 53, valves 55, 56 and 57, the surge tank 31, a circulation pump 32, a valve 33, and an open/close valve 34 are provided to the circulation pipe 35 in this order from the upstream end. A pipe 71 bypassing the valve 49 and provided with a valve 50 and the filter 51, is connected to the circulation pipe 35. A pipe 66 bypassing the heater 53 and the valve 55 is connected to the circulation pipe 35. A cooler 58 and a valve 59 are installed to the pipe 66. The cation exchange resin tower 60 and a valve 61 are installed to a pipe 67 bypassing the valve 56. Both ends of the pipe 67 are connected to the circulation pipe 35. A mixed-bed resin tower 62 and a valve 63 are installed to a pipe 68 bypassing the cation exchange resin tower 60 and the valve 61. Both ends of the pipe 68 are connected to the pipe 67.

A valve 65 and the decomposition apparatus 64 are installed to a pipe 69 connected to the circulation pipe 35, bypassing the valve 57. The inside of the decomposition apparatus 64 is filled with, for example, active carbon catalysts that were made by adhering ruthenium to surface of active carbon. The surge tank 31 is installed to the circulation pipe 35 between the valve 57 and the circulation pump 32. A pipe 70 provided with a valve 36 and an ejector 37 is connected to the circulation pipe 35 between the valve 33 and the circulation pump 32, and is further connected to the surge tank 31. A hopper (not shown) is provided to the ejector 37 to supply the surge tank 31 with potassium permanganate (an oxidation decontamination agent) used for oxidation dissolution of contaminations on the inner surface of the feed water pipe 10 on which surface a nickel ferrite film is to be formed, and further with oxalic acid (a reduction decontamination agent) used for reduction dissolution of contaminations on the inner surface of the feed water pipe 10.

The iron (II) ion injection apparatus 85 has a bath tank 45, an injection pump 43, and an injection pipe 72. The bath tank 45 is connected to the circulation pipe 35 through the injection pipe 72 having the injection pump 43 and a valve 41. The bath tank 45 is filled with an agent (a first agent) containing divalent iron (II) ions prepared by dissolving iron in formic acid. This agent contains formic acid. The agent for dissolving iron is not limited to formic acid, but organic acid or carbonic acid, which can be counter-anions to the iron (II) ions, may be used. The oxidizing agent injection apparatus 86 has a bath tank 46, an injection pump 44, and an injection pipe 73. The bath tank 46 is connected to the circulation pipe 35 through the injection pipe 73 having the injection pump 44 and a valve 42. The bath tank 46 is filled with hydrogen peroxide, which is an oxidizing agent (a third agent). The pH adjustment agent injection apparatus 87 has a bath tank 40, an injection pump 39, and an injection pipe 74. The bath tank 40 is connected to the circulation pipe 35 through the injection pipe 74 having the injection pump 39 and a valve 38. The bath tank 40 is filled with hydrazine, which is a pH adjustment agent (a fourth agent).

The nickel ion injection apparatus 88 has a bath tank 80, an injection pump 81, and an injection pipe 83. The bath tank 80 is connected to the circulation pipe 35 through the injection pipe 83 having the injection pump 81 and a valve 82. The bath tank 80 is filled with an agent (a second agent) containing divalent nickel ions prepared by dissolving nickel formate in formic acid. This agent contains formic acid. The agent for dissolving nickel is not limited to formic acid, but organic acid or carbonic acid, which can be counter-anions to iron (II) ions, may be used. The inventors have studied a method for dissolving nickel with formic acid. A result of this has shown that adding a small amount of formic acid to solid nickel formate allowed the nickel formate to be completely dissolved, yielding an agent (the second agent) containing nickel (II) ions usable for forming a nickel metal film and nickel ferrite film.

In the present embodiment, a first connection point 77 of the pH adjustment agent injection apparatus 87 to the circulation pipe 35 (the connection point of the injection pipe 74 and the circulation pipe 35) is located at the lowest point of the stream among the first connection point 77, a second connection point 78 of the iron (II) ion injection apparatus 85 to the circulation pipe 35 (the connection point of the injection pipe 72 and the circulation pipe 35), a third connection point 84 of the nickel ion injection apparatus 88 to the circulation pipe 35 (the connection point of the injection pipe 83 and the circulation pipe 35), and a fourth connection point 79 of the oxidizing agent injection apparatus 86 to the circulation pipe 35 (the connection point of the injection pipe 73 and the circulation pipe 35). The other connection points are disposed upstream of the first connection point 77, that is, disposed in order of the third connection point 84, the second connection point 78, and the fourth connection point 79 toward the circulation pump 32. In the circulation pipe 35, the first connection point 77 is preferably positioned as close as possible to a target region for chemical decontamination and nickel ferrite film formation. A pipe 75 provided with a valve 54 communicates between the pipe 73 and the pipe 69. A pH meter 76 is installed to the circulation pipe 35 downstream of the first connection point 77. Before each agent is injected into the circulation pipe 35, the surge tank 31 is filled with water for treatment. In order to remove oxygen dissolved in an aqueous solution, bubbling of an inert gas such as nitrogen or argon in the bath tank 45 and the surge tank 31 is preferable.

The decomposition apparatus 64 can resolve oxalic acid used for reduction decontamination in chemical decontamination, organic acid (for example, formic acid) used as counter-anions to iron (II) ions, and hydrazine which is a pH adjustment agent. In other words, as counter-anions to iron (II) ions, organic acid which can be resolved into water and carbon dioxide, or carbonic acid which can be released as gas to decrease a waste is used in consideration of waste reduction.

The method for forming a nickel ferrite film according to the present embodiment is described in detail with reference to FIG. 1. Procedures shown in FIG. 1 include not only the procedures for forming a nickel ferrite film but also the procedures for chemical decontamination and for treatment of a film-forming aqueous solution used for forming the nickel ferrite film. First, the film formation apparatus 30 is connected to a film-forming object piping (Step S1). That is, after operation of the BWR plant is shut down for an annual inspection of the BWR plant, and while the operation of the BWR plant is being shut down, the circulation pipe 35 is, as described above, connected to the feed water pipe 10 which is a piping of a film forming object.

Chemical decontamination is performed to the film forming object region (Step S2). An oxide film has been formed on the inner surface of the feed water pipe 10, come into contact with feed water. In a BWR plant, this oxide film includes radioactive nuclides. An example of Step S2 is a process to remove the oxide film from the inner surface of the feed water pipe 10, which is the film forming object region, by chemical treatment. While the purpose of forming the nickel ferrite film on the piping of the film forming object is to suppress corrosion of the inner surface of the feed water pipe, it is preferable to perform chemical decontamination of the inner surface of the feed water 10 before the film is formed.

The chemical decontamination applied in the step S2 has been a known method (see Japanese Patent Laid-open No. 2000-105295), and is briefly described here. First, each of the valves 34, 33, 57, 56, 55, 49, and 47 is opened and the circulation pumps 32 and 48 are driven while the other valves are closed. This circulates water in the surge tank 31 to the feed water pipe 10. The circulating water is heated by the heater 53, and when the temperature of the water reaches 90° C., the valve 36 is opened. A required amount of potassium permanganate ($KMnO_4$) supplied from the hopper linked to the ejector 37 is introduced into the surge tank 31 by water flowing in the pipe 70. The $KMnO_4$ is dissolved in water in the surge tank 31, and then, an oxidation decontamination solution (a $KMnO_4$ solution) is produced. This oxidation decontamination solution is supplied into the feed water pipe 10 from the surge tank 31 through the circulation pipe 35 by operation of the circulation pump 32. The oxidation decontamination solution oxidizes and dissolves contaminations such as the oxide film formed on the inner surface of the feed water pipe 10.

After the oxidation decontamination is completed, oxalic acid is injected into the surge tank 31 from the above hopper. This oxalic acid resolves the $KMnO_4$ dissolved in the oxidation decontamination solution. Then, a reduction decontamination solution (an oxalic acid solution) produced in the surge tank 31, whose pH is adjusted, is supplied into the feed water pipe 10 by the circulation pump 32 to perform reduction dissolution of corrosion products adhering on the inner surface of the feed water pipe 10. The pH of the reduction decontamination solution is adjusted by hydrazine supplied into the circulation pipe 35 from the bath tank 40. Part of the reduction decontamination solution discharged from the feed water pipe 10, returned to the circulation pipe 35 is introduced to the cation exchange resin tower 60 by necessary valve operations to remove metal positive ions.

After the reduction decontamination is completed, the valve 65 is opened to adjust degree of the opening of the valve 57, and part of the reduction decontamination solution flowing in the circulation pipe 35 is supplied to the decomposition apparatus 64. The oxalic acid and hydrazine contained in this reduction decontamination solution are resolved by the action of hydrogen peroxide ($H_2O_2$) introduced to the decomposition apparatus 64 from the bath tank 46 through the pipe 75 and by the action of active carbon catalyst in the decomposition apparatus 64. After the oxalic acid and hydrazine are resolved, the valve 55 is closed to stop heating by the heater 53, and at the same time, the valve 59 is opened to cool the decontamination solution by the cooler 58. The cooled decontamination solution (for example, to 60° C.) is supplied to the mixed-bed resin tower 62 to remove impurities.

The suppression method for corrosion according to the present embodiment (Steps S1 and S3 to S10) can be applied to a piping (a feed water pipe, etc.) in a newly-built plant, for example, a newly-built BWR plant to form a nickel ferrite film on the inner surface of the piping. When the present embodiment is to be applied to a newly-built BWR plant which has not ever been in operation, the steps S1 and S3 to S9 are performed before the operation of the newly-built BWR plant is started, and Step S10 is performed during the operation of the newly-built BWR plant. In a newly-built BWR plant, no radioactive material is adhered on the inner surface of the piping before the beginning of the operation, thus the chemical decontamination process in the step S2 is not necessary. The chemical decontamination process in the step S2 is performed when the nickel ferrite film is to be formed on a piping (a feed water pipe, etc.) of an existing BWR plant which has been in operation.

After the chemical decontamination of the carbon steel member is completed, a process of forming the nickel ferrite film is executed.

After the decontamination of the film-forming object region is completed, the temperature of the film-forming aqueous solution is adjusted (Step S3). After the decontamination of the film-forming object region is completed, that is, after the last clean-up operation by the film formation apparatus 30 is finished, the following valve operations are performed. The valve 50 is opened and the valve 49 is closed to start passing water to a filter 51. The valve 56 is opened and the valve 63 is closed to stop passing water to the mixed-bed resin tower 62. Furthermore, the valve 55 is opened and the valve 59 is closed, and then, the water flowing in the circulation pipe 35 is heated to a predetermined temperature by the heater 53. The valves 47, 57, 33 and 34 are opened while the valves 36, 61, 65, 38, 41, 42, and 54 are closed. Water is passed to the filter 51 to remove minute solids remained in the water so that the ferrite film is prevented from being formed on the surface of these solids and wasting agents.

While the film is being formed on the inner surface of the feed water pipe 10, the temperature of the film-forming aqueous solution is preferably maintained about 75° C., but not limited to this temperature. It is fine as long as film components, such as nickel ferrite film crystals, are formed closely-packed enough for the film to suppress corrosion of the carbon steel member during the reactor operation. Thus, the temperatures of the film-forming aqueous solution is preferably equal to or lower than the maximum working temperature of the feed water pipe 10, that is, 200° C. or lower. While the temperature of the film-forming aqueous solution is preferably 200° C. or lower, the lowest limit may be 20° C., however, it is preferably 60° C. or higher at which temperatures, the velocity of ferrite film generation is practical. At temperatures of 100° C. or above, the film-forming aqueous solution must be pressurized to prevent boiling, which requires temporary equipment to be pressure resistant and to be made larger. Since this is not desirable, the temperature of the film-forming aqueous solution in the film forming process is preferably 100° C. or below, and is preferably controlled in a range between 60 to 100° C.

Dissolved oxygen in the film-forming aqueous solution must be removed to avoid the iron (II) ions contained in the first agent from being oxidized to produce $Fe(OH)_3$. For this reason, inert gas bubbling or vacuum degassing is preferably performed in the surge tank 31 and the bath tank 45.

An agent containing nickel ions (the second agent) is injected in the film-forming aqueous solution (Step S4). By opening the valve 82 and driving the injection pump 81, a bath containing nickel ions and formic acid (the second agent) is injected from the bath tank 80 through the injection pipe 83 to the film-forming aqueous solution (which is water when the second agent is first injected) at a predetermined temperature (for example, 75° C.) flowing in the circulation pipe 35. The film-forming aqueous solution (the film-forming solution), which is a solution with a pH of 4.0, containing nickel ions and formic acid, is supplied into the feed water pipe 10 through the circulation pipe 35. This solution discharged from the feed water pipe 10 returns to the circulation pipe 35. If the pH of the solution containing nickel ions and formic acid becomes lower than 4.0, hydrazine is injected into the circulation pipe 35 from the pH adjustment agent injection apparatus 87 to adjust the pH to 4.0.

This solution contacts the inner surface of the feed water pipe 10, consequently, irons contained in the base material of the feed water pipe (the carbon steel member) 10 are eluted as iron (II) ions into the film-forming aqueous solution from the inner surface of the feed water pipe 10 by an effect of formic acid contained in the aqueous solution. When the iron (II) ions are eluted into the aqueous solution, electrons ($2e^-$) are released into the aqueous solution from the feed water pipe 10. Nickel ions contained in the aqueous solution and existing near the inner surface of the feed water pipe 10, capture the electrons and become nickel metal. This nickel metal adheres on the inner surface of the feed water pipe, come into contact with the solution. In other words, since the nickel ions contained in the solution has a lower ionization tendency than the iron (II) ions eluted from the feed water pipe 10, the nickel ions become nickel metal according to the reaction of Equation (1), and this nickel metal adheres on the inner surface of the feed water pipe 10. A nickel metal film, which is a corrosion protection film, is eventually formed over the entire inner surface of the feed water pipe 10, come into contact with the film-forming aqueous solution containing nickel ions and formic acid. The nickel metal adheres on the inner surface of the feed water pipe 10 while iron (II) ions are being eluted into the aqueous solution from the feed water pipe 10. When the nickel metal film is formed over the entire inner surface of the pipe 10, come into contact with the solution containing nickel ions and formic acid, the nickel metal film blocks iron (II) ions from eluting into the aqueous solution from the feed water pipe 10, thus stops the nickel metal from adhering on the inner surface of the feed water pipe 10. The agent containing the nickel ions and formic acid is continuously injected into the film-forming aqueous solution until the formation of the nickel metal film is completed.

Since a heat exchanger tube of each of the low pressure feed water heater 8 and the high pressure feed water heater 9 is made of stainless steel, no nickel metal film is formed on the outer surface of the heat exchanger tube, come into contact with feed water. Since a shell of each of these feed water heaters is made of carbon steel, the nickel metal film is formed on an inner surface of the shell come into contact with the feed water. If the shell is made of stainless steel, no nickel metal film is formed on the inner surface of the shell.

A bath (the first agent) containing iron (II) ions is injected in the film-forming aqueous solution (Step S5). The valve 41 is opened and the injection pump 43 is driven, and then, the bath (the first agent) containing iron (II) ions and formic acid is injected from the bath tank 45 through the injection pipe 72 into the film-forming aqueous solution containing nickel ions, flowing in the circulation pipe 35. The first agent to be injected here contains, for example, iron (II) ions prepared by dissolving iron in formic acid, and the formic acid. Part of the iron (II) ions injected becomes ferrous hydroxide ($Fe(OH)_2$) in the film-forming aqueous solution. The first agent is preferably added immediately after the nickel metal film is formed on the inner surface of the feed water pipe 10 (the surface of the carbon steel member, come into constant with the feed water). The nickel metal film is formed over the entire inner surface of the feed water pipe 10, come into constant with the film-forming aqueous solution. The formation of the nickel metal film is checked by measuring the corrosion current of the feed water pipe 10. When the nickel metal film is formed on the inner surface of the feed water pipe 10, the corrosion current of the feed water pipe 10 is reduced. Based on this reduction in corrosion current, the formation of the nickel metal film can be confirmed. The first agent may be injected when a certain amount of set time (for example, 5 minutes) has passed after the injection of the agent containing nickel ions is started. This set time is a time required for completing the formation of the nickel metal film, predetermined by experiments, etc. The injection of the first agent may begin at any time as long as it is after the injection of the second agent, and could begin at other times than when the nickel metal film has just formed over the entire inner surface of the feed pipe 10, come into constant with the solution.

Oxidizing agent is injected into the film-forming aqueous solution (Step S6). The valve 42 is opened and the injection pump 44 is driven, and then, hydrogen peroxide, which is an oxidizing agent, is injected from the bath tank 46 through the injection pipe 73 into the film-forming aqueous solution containing nickel ions, iron (II) ions, and $Fe(OH)_2$, flowing in the circulation pipe 35. As oxidizing agent besides hydrogen peroxide, an agent including ozone or oxygen dissolved may be used.

A pH adjustment agent (the fourth agent) is injected into the film-forming aqueous solution (Step S7). The valve 38 is opened and the injection pump 39 is driven, and then, a pH adjustment agent (for example, hydrazine) is injected from the bath tank 40 through the injection pipe 74 into the film-forming aqueous solution flowing in the circulation pipe 35. The pH meter 76 measures pH of the film-forming aqueous solution flowing in the circulation pipe 35. Based on the pH measurement, a control apparatus (not shown) controls the rotation speed of the injection pump 39 (or the degree of the opening of the valve 38) to adjust the injection amount of hydrazine, adjusting the pH of the film-forming aqueous solution to, for example, 7.0 in a range between 5.5 and 9.0. That is, the pH of the film-forming aqueous solution containing hydrazine, iron (II) ions, nickel ions, $Fe(OH)_2$, formic acid, and hydrogen peroxide is adjusted to 7.0.

The oxidizing agent and the pH adjustment agent are injected into the circulation pipe 35 after the nickel metal film is formed over the entire inner surface of the feed water pipe 10, come into contact with the aqueous solution.

Since the film-forming aqueous solution containing nickel ions, iron (II) ions, $Fe(OH)_2$, and hydrogen peroxide, whose pH is adjusted, for example, to 7.0 in a range between 5.5 and 9.0, flows in the feed water pipe 10, the nickel ions, iron (II) ions, and $Fe(OH)_2$ are absorbed on the surface of the nickel metal film (the surface come into contact with the film-forming aqueous solution) formed on the inner surface of the feed water pipe 10, which is the carbon steel member, and transformed into nickel ferrite. Because of this, the nickel ferrite film is formed on the surface of the nickel metal film. The hydrogen peroxide, which is an oxidizing agent contained in the film-forming aqueous solution, oxidizes the iron (II) ions and $Fe(OH)_2$ absorbed on the surface of the nickel metal film to creates a reaction for transforming into the nickel ferrite film. The nickel ferrite film is formed on the surface of the nickel metal film as described above because the pH of the film-forming aqueous solution is adjusted by hydrazine to 7.0 in a range between 5.5 and 9.0, in which range, the reaction of nickel ferrite film generation can progress.

Since the circulation pumps 32 and 48 are driven, the film forming solution containing hydrazine, nickel ions, ferrous (II) ions, $Fe(OH)_2$, and hydrogen peroxide is supplied to the feed water pipe 10 through the circulation pipe 35 and the open/close valve 34. This film-forming aqueous solution flows in the feed water pipe 10, and returns to the open/close valve 47 side of the circulation pipe 35. The returned film-forming aqueous solution, into which the agent containing ferrous (II) ions and formic acid (the first agent), the agent containing nickel ions and formic acid (the second agent), hydrogen peroxide (the third agent), and hydrazine (the fourth agent) are injected, is introduced again into the feed water pipe 10. The inner surface of the feed water pipe 10 is come into contact with the film forming solution (a film forming liquid) to allow the nickel ions, iron (II) ions, and $Fe(OH)_2$ to be adsorbed on the surface of the nickel metal film formed on the inner surface of the feed water pipe 10, which is the carbon steel member, and on the inner surfaces of the shells of the feed water heaters 8 and 9. This adsorbed nickel ions, iron (II) ions, and $Fe(OH)_2$ become nickel ferrite by the action of hydrogen peroxide. Since the pH of the film-forming aqueous solution is adjusted to 7.0 by the action of hydrazine, the ferrite film (the nickel ferrite film) having the nickel ferrite as its major component is formed on the surface of the nickel metal film formed on the inner surface of the feed water pipe 10.

After the nickel metal film is formed on the surface of the carbon steel member according to the step S4, the agent containing irons (II) ions (the first agent), hydrogen peroxide (the third agent), and hydrazine (the fourth agent) are injected into the film-forming aqueous solution including nickel ions. After the nickel metal film is formed, in particular, the injection of each agent is preferably performed continuously in the steps S4, S5, S6, and S7. To be more specific, after the nickel metal film is formed on the surface of the carbon steel member, the agent containing iron (II) ions is injected into the film-forming aqueous solution when the film-forming aqueous solution injected with the oxidizing agent at the fourth connection point 79 reaches the second connection point 78. When the film-forming aqueous solution containing these oxidizing agent and iron (II) ions reaches the third connection point 84, the agent containing nickel ions are injected into the film-forming aqueous solution. When the film-forming aqueous solution containing these oxidizing agent, iron (II) ions, and nickel ions reaches the first connection point 77, the pH adjustment agent is injected into the film-forming aqueous solution.

In order to prevent wasteful nickel ferrite film formation on the inner surface of the circulation pipe 35, the injection point of the pH adjustment agent into the circulation pipe 35 is preferably close to the feed water pipe 10, which is the film-forming object, that is, near the connection point of the open/close valve 34 and the circulation pipe 35.

Whether the nickel ferrite film-forming process is completed or not is determined (Step S8). This check is performed based on an elapsed time after the nickel ferrite film formation process is started, that is, after the injection of the first agent is started and the injections of the oxidizing agent and the pH adjustment agent are started. Before the elapsed time reaches the time required for forming the nickel ferrite film of a predetermined thickness on the surface of the nickel metal film formed on the inner surface of the feed water pipe 10, the determination in the step S8 will result in "NO". Then, the operations of the steps S4 to S7 are repeated. When the determination in the step S8 becomes "YES", a control apparatus (not shown) stops the injection pumps 39, 43, 44, and 81 (or the valves 38, 41, 42, and 82 are closed) to stop the injection of each agent into the circulating film-forming aqueous solution, thereby completing the operation of forming the nickel ferrite film on the surface of the nickel metal film formed on the inner surface of the feed water pipe 10.

The agent containing ferrous (II) ions (the first agent), the agent containing nickel ions (the second agent), hydrogen peroxide (the third agent), and hydrazine (the fourth agent) are continuously injected into the film forming solution until the nickel ferrite film of a predetermined thickness is formed.

Then, the agents contained in the film-forming aqueous solution are resolved (Step S9). The film-forming aqueous solution used for forming the nickel ferrite film on the surface of the nickel metal film formed on the inner surface of the feed water pipe 10 still contains hydrazine and formic acid, which is organic acid, after the nickel ferrite film formation is completed. When the determination in the step S8 results in "YES", the hydrazine and formic acid contained in the film-forming aqueous solution are decomposed in the decomposition apparatus 64 in the same manner as the decomposition of oxalic acid, which is a reduction decontamination agent. In the decomposition process of the agents, by adjusting the degree of the opening of the valves 57 and 65, part of the film-forming aqueous solution in the circulation pipe 35 is supplied into the decomposition apparatus 64. The hydrogen peroxide is introduced from the bath tank 46 to the decomposition apparatus 64 through the pipe 75 by opening the valve 54. The hydrazine and formic acid are decomposed in the decomposition apparatus 64 by the action of hydrogen peroxide and active carbon catalyst. The hydrazine is decomposed into nitrogen and water, and the formic acid into carbon dioxide and water. After the decomposition of the agents contained in the film-forming aqueous solution is completed, the circulation pipe 35 is removed from the feed water pipe 10, and the valve 28 and so on are restored to their former states. Then, the BWR plant will be ready to start its operation.

It is possible to use an ultraviolet irradiation apparatus in place of the decomposition apparatus 64 using catalyst. The ultraviolet irradiation apparatus can also decompose hydrazine, formic acid, and oxalic acid in the presence of oxidizing agent.

By decomposing hydrazine and formic acid into gas and water in the decomposition apparatus 64, as described above, removal of hydrazine in the cation exchange resin tower 60 and removal of formic acid in the mixed-bed resin tower 62 can be avoided. Thus, the waste amount of used ion-exchange resin in the cation exchange resin tower 60 can be significantly reduced.

After the decomposition of the agents is completed in the step S9, both ends of the circulation pipe 35 are removed from the feed water pipe 10 and the bonnet of the valve 26 is restored to its former state before start up of the BWR plant. Hydrothermal treatment is performed to transform the nickel metal film into the nickel ferrite film (Step S10). After the bonnet of the valve 28 is restored to its former hermetically-sealed state, the operation of the BWR plant is started up. A plurality of control rods (not shown) are withdrawn from the core 13 to make the reactor 1 into a critical state. Then, a plurality of control rods are further withdrawn from the core 13 to raise the temperature and pressure of the reactor 1 until the pressure inside the RPV 12 reaches the rated pressure (for example, about 6.5 MPa), and the temperature of cooling water in the RPV 12 rises to the rated temperature (for example, about 288° C.). When the pressure in the RPV 12 reaches about 6.5 MPa and the temperature of the cooling water about 288° C., the reactor power is risen to the rated power (100% power) by the withdrawing operation of the control rods and the increase of the flow rate (the core flow rate) of the cooling water supplied to the core 13.

The steam generated in the RPV 12 during the temperature and pressure raising process of the reactor 1, is supplied to the condenser 4 through a turbine bypass pipe (not shown) connected to the main steam pipe 2 upstream of the turbine 3, and condensed to turn into water in the condenser 4. This water is pressurized by the condensate pump 5 and the feed water pump 7, and supplied to the RPV 12 through the feed water pipe 10 as feed water. At this time, no extraction steam is supplied to the low pressure feed water heater 8 and the high pressure feed water heater 9, thus, the feed water is not yet heated by the low pressure feed water heater 8 and the high pressure feed water heater 9.

After the pressure in the RPV 12 has reached the rated pressure and the temperature of the cooling water in the RPV 12 has reached the rated temperature, the reactor power is risen to the rated power (100% power) by the withdrawing operation of the control rods and the increase of the flow rate (the core flow rate) of the cooling water supplied to the core 13. During this process of rising the reactor power, when the reactor power reaches a certain value, steam is supplied to the turbine 3. Water generated by the condenser 4 by condensing the steam discharged from the turbine 3 is introduced into the RPV 12 as feed water. The steam extracted from the turbine 3 is supplied to the low pressure feed water heater 8 and the high pressure feed water heater 9 through the extraction pipe 15. The feed water is heated by the low pressure feed water heater 8 and the high pressure feed water heater 9 to rise its temperature, and supplied to the RPV 12. In the operation period of the BWR plant, the feed water is heated by the low pressure feed water heater 8 and the high pressure feed water heater 9 while steam is being supplied to the turbine 3.

Although not shown in the figures, in the BWR plant, 4 stages of low pressure feed water heaters 8 and 2 stages of high pressure feed water heaters 9 are actually provided to the feed water pipe 10. When the feed water heaters are referred to as the first stage, the second stage, the third stage, and so on from the RPV 12 to the condenser 4, a first stage high pressure feed water heater 9, a second stage high pressure feed water heater 9, a third stage low pressure feed water heater 8, a fourth stage low pressure feed water heater 8, a fifth stage low pressure feed water heater 8, and a sixth stage low pressure feed water heater 8 are disposed in this order from the RPV 12 to the condenser 4. The temperature of feed water supplied to the sixth stage low pressure feed water heater 8 located in the uppermost stream is approximately 30° C., and the temperature of feed water discharged from the first stage high pressure feed water heater 9 located in the lowermost stream is approximately 210° C. The feed water at about 210° C. is supplied to the RPV 12. The feed water becomes about 180° C., which is above 150° C., in the second stage high pressure feed water heater 9. The temperature of feed water discharged from each of the third, fourth, fifth, and sixth stage low pressure feed water heaters 8 is less than 150° C.

On the inner surface of the feed water pipe 10 between the valve 28 and the connection point of the feed water pipe 10 and the branch pipe to which the circulation pipe 35 is connected, a double-layer film (a nickel metal film and a nickel ferrite film) is formed by the procedures of the steps S1 to S8. When the steam is supplied to the turbine 3, the open/close valve 99 is opened to supply oxygen from the oxygen supply apparatus 98 though the oxygen supply pipe 100 into the feed water pipe 10 between the condensate water clean-up apparatus 6 and the low pressure feed water heater 8, adding the oxygen to feed water flowing in the feed water pipe 10. The feed water containing 20 ppb of dissolved oxygen flows in the feed water pipe 10 toward the RPV 12, contacting the surface of the nickel ferrite film of the double-layer film formed on the inner surface of the feed water pipe 10.

In a section of the feed water pipe 10 where the temperature of the feed water becomes 150° C. or above, that is about 180° C. or above, between the second stage high pressure feed water heater 9 and the connection point of the feed water pipe 10 and the branch pipe to which the circulation pipe 35 is connected, oxygen ions contained in the feed water diffuse into the nickel ferrite film formed on the surface of the nickel metal film formed on the inner surface of the feed water pipe 10 to reach the nickel metal film. Since the temperature of the feed water pipe 10 in the section of the feed water pipe 10 has been risen to at least about 180° C., iron ions diffuse toward the nickel metal film from the base material (the carbon steel member) of the feed water pipe 10 in the section. The oxygen ions and the iron ions reached the nickel metal film by diffusion react with nickels contained in the nickel metal film, thereby generating nickel ferrite. Eventually, the entire nickel metal film formed in the section of the feed water pipe 10 between the second stage high pressure feed water heater 9 and the connection point of the feed water pipe 10 and the branch pipe to which the circulation pipe 35 is connected, is transformed into a nickel ferrite film by supplying the oxygen-dissolved feed water into the feed water pipe 10. The nickel metal film formed on the inner surface of each shell of the first stage and the second stage high pressure feed water heaters 9 also transforms into the nickel ferrite film. When the surface of the nickel ferrite film is come into contact with the feed water containing 200 ppb or more of dissolved oxygen, the nickel metal film can be transformed into the nickel ferrite film. The nickel metal film can be transformed into the nickel ferrite film by using feed water containing 200 ppb of dissolved oxygen as well. For this reason, a thick single-layer nickel ferrite film is formed on the inner surface of the feed water pipe 10 by transforming the nickel metal film into the nickel ferrite film between the second stage high pressure feed water heater 9 and the connection point of the feed water pipe 10 and the branch pipe to which the circulation pipe 35 is connected.

When hydrogen is to be injected into the RPV 12 through the feed water pipe 10, it can be injected while oxygen is being supplied into the feed water pipe 10 to transform the nickel metal film into the nickel ferrite film.

In the feed water pipe 10 upstream of the second stage high pressure feed water heater 9, the temperature of the feed water flowing in this section of the feed water pipe 10 is less then 150° C., consequently, slowing the diffusion of the oxygen ions contained in the feed water into the nickel ferrite film and the diffusion of the iron ions from the base material of the feed water pipe 10 into the nickel metal film. For this reason, in the section of the feed water pipe 10 upstream of the second stage high pressure feed water heater 9 and downstream of the valve 28, there exists a region where the double-layer film (the nickel metal film formed on the inner surface of the feed water pipe 10 and the nickel ferrite film formed on the surface of the nickel metal film) is formed on the inner surface of the feed water pipe 10.

When the transformation of the nickel metal film into the nickel ferrite film by hydrothermal treatment is completed, oxygen supply from the oxygen supply apparatus 98 into the circulation pipe 35 is stopped.

In the present embodiment, the nickel metal film between the nickel ferrite film and the feed water pipe 10 in the double-layer film formed on the inner surface of the feed water pipe 10 downstream of the second stage high pressure feed water heater 9, which becomes high temperature of 150° C. or above, is transformed into a nickel ferrite film, thus, in addition to the nickel ferrite film already formed, a thick nickel ferrite film (for example, 800 nm [see FIG. 8]) can be formed on the inner surface of the feed water pipe 10. The formation of such a thick nickel ferrite film can significantly reduce corrosion of the feed pipe 10 downstream of the second stage high pressure feed water heater 9, come into contact with high-temperature feed water of 150° C. or above (see the test piece B in FIG. 7). In a section of the feed water pipe 10 downstream of the first stage high pressure feed water heater 9, come into contact with the feed water of about 210° C., as well, the thick nickel ferrite film can significantly reduce corrosion of the feed water pipe 10. In the present embodiment, since the thickness of the nickel ferrite film, which is more closely-packed than the nickel metal film, can be increased, the corrosion of the carbon steel member can be suppressed even when the carbon steel member is come into contact with high-temperature feed water.

In the present embodiment, the nickel metal film between the nickel ferrite film and the feed water pipe 10 can be easily transformed into a nickel ferrite film in an early period of the BWR plant operation at the rated power, by starting up the BWR plant to expose the surface of the nickel ferrite film to the high-temperature oxygen-dissolved feed water. In other words, an extra treatment process is unnecessary, and the nickel metal film can be easily transformed into the nickel ferrite film by simply operating the BWR plant.

Figure 9:
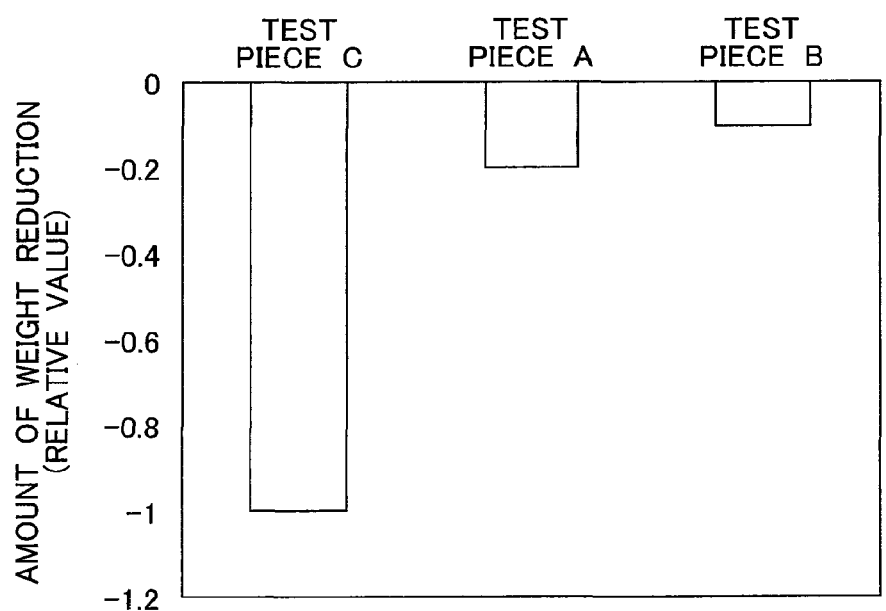
FIG. 9 is an explanatory drawing showing suppression effect of corrosion on carbon steel members on surface of which a nickel ferrite film is formed, when the member is immersed in low-temperature water.

There exists a double-layer film formed on the inner surface of the feed water pipe 10 between the valve 28 and the third stage low pressure feed water heater 8. This double-layer film has the nickel metal film between the nickel ferrite film and the feed water pipe 10. This double-layer film can suppress corrosion of the feed water pipe 10, which is the carbon steel member, more than the nickel ferrite film formed on the surface of the carbon steel member in the method A. The inventors have conducted a corrosion test of the test pieces A, B, and C in low temperature by immersing the previously-described test pieces A, B, and C into water without dissolved-oxygen at 280° C. for 500 hours. A result of this corrosion test is shown in FIG. 9. The corrosion of the carbon steel member of the test piece B is reduced more than the corrosion of the carbon steel member of the test piece A when it is come into contact with low-temperature water of 280° C. as well. For this reason, the double-layer film formed on the feed pipe 10 between the valve 28 and the third stage low pressure feed water heater 8 can reduce corrosion more than the nickel ferrite film formed in the method A.

In the present embodiment, the following new effects can be obtained by forming the nickel metal film on the inner surface of the feed water pipe 10 between the valve 28 and the connection point of the feed water pipe 10 and the branch pipe to which the circulation pipe 35 is connected.

It has become clear that, in the method of forming a nickel ferrite film disclosed in Japanese Patent Laid-open No. 2007-182604, that is, in the method A, it takes long time for the nickel ferrite film to be formed on the surface of a carbon steel member. The inventors have done a detailed study and experiments to find out a cause for the method A to require long time for forming the film.

Figure 10:
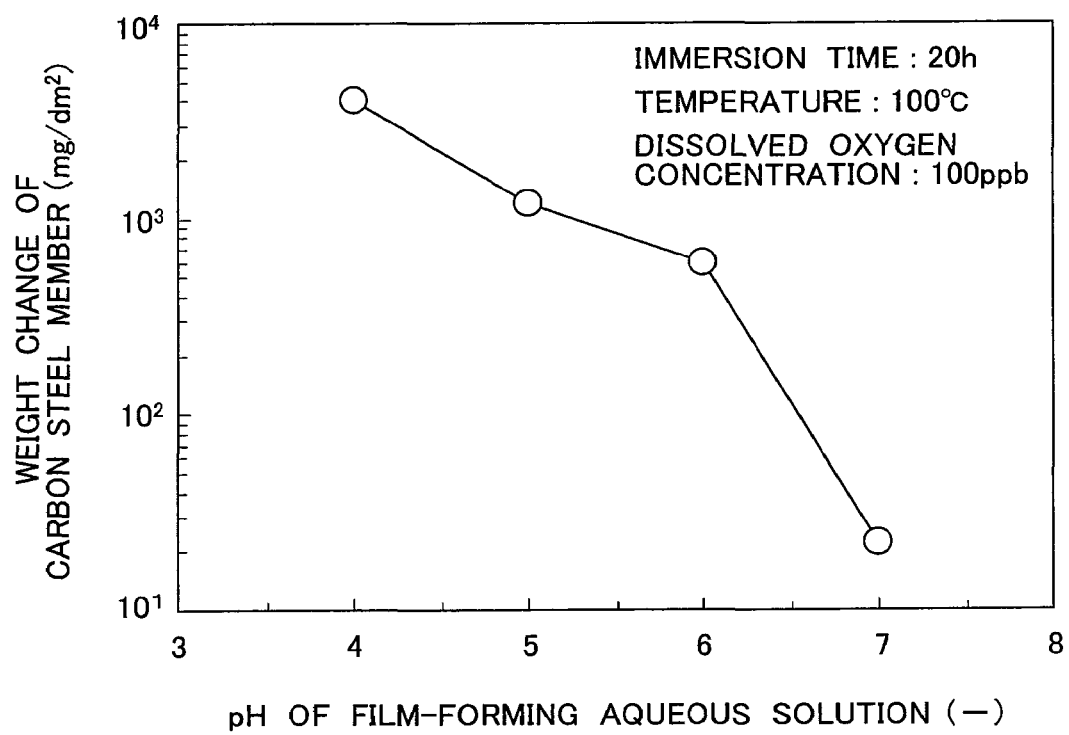
FIG. 10 is a characteristic diagram showing a relationship between pH of a film-forming aqueous solution contacting a carbon steel member and a change in weight (amount of corrosion) of the carbon steel member.

A first agent is made by dissolving iron into formic acid (or carbonic acid), thus, it contains formic acid (or carbonic acid) as well as iron (II) ions. When this first agent was added to water in the amount required for forming the nickel ferrite film, the pH of the aqueous solution of the first agent became about 4. When a carbon steel member, which can be used in a BWR plant, was immersed in a aqueous solution containing the first agent (100 ppb dissolved-oxygen concentration), with a pH of 4 at a temperature of 100° C., for 20 hours, the weight of the carbon steel member has decreased by $4 \times 10^3$ mg/dm$^2$ compared to the weight before the immersion as shown in FIG. 10. This means that the carbon steel member has corroded by the amount due to the action of formic acid contained in the aqueous solution with a pH of about 4. As a result, the inventors have found out that the reason for the nickel ferrite film to take long time to be formed on the carbon steel member is that, because the first agent is added at first, the surface of the carbon steel member is briefly come into contact with the aqueous solution with a pH of about 4, causing the carbon steel member to lose its weight by corrosion.

In the method A, when the agents are added to the film-forming aqueous solution in the order of the first agent containing iron (II) ions, the second agent containing nickel ions, the third agent containing oxidizing agent, and the fourth agent containing a pH adjustment agent, there is a period after the carbon steel member is come into contact with the aqueous solution containing the first and second agents but before the surface of the carbon steel member is come into contact with the aqueous solution containing the third and fourth agents; during which period, the surface of the carbon steel member is come into contact with the aqueous solution with a pH of about 4. The weight reduction of the carbon steel member by corrosion in this period causes the nickel ferrite film to take long time to be formed on the carbon steel member. In other words, because the surface of the carbon steel member is come into contact with the aqueous solution with a pH of about 4, iron (II) ions elute into the solution form the surface of the carbon steel member. Due to an effect of the iron (II) ions eluted, iron (II) ions contained in the first agent added to the aqueous solution become less absorbent to the surface of the carbon steel member. Before the second agent containing nickel ions, added after the first agent, reaches the feed water pipe 10, numerous iron (II) ions are eluted from the inner surface of the feed water pipe 10. The elution of such numerous iron (II) ions affects the added iron (II) ions, reducing the absorption amount of the added iron (II) ions on the member surface. Moreover, because of the presence of the added iron (II) ions and the numerous iron (II) ions eluted from the inner surface of the feed water pipe 10, the absorption rate of the nickel ions onto the surface of the carbon steel member is significantly reduced. From the above reasons, it takes long time for the nickel ferrite film to be formed on the surface of the carbon steel member.

The inventors have found out that this problem can be solved by initially forming a nickel metal film on the surface of the carbon steel member. Since nickel ions have a lower ionization tendency than iron ions, the nickel metal film can be formed on the surface of the carbon steel member. The nickel metal film is a corrosion protection film.

In the present embodiment, after the nickel metal film has formed on the entire inner surface of the feed water pipe 10, come into contact with the film-forming aqueous solution including the agent containing nickel ions, then, the agent containing iron (II) ions is injected into the film-forming aqueous solution. For this reason, in the present embodiment, even when the pH of the film-forming aqueous solution supplied to the feed water pipe 10 becomes 4.0 before the injection of hydrazine due to the effect of formic acid contained in the first agent after injection of the first agent, corrosion of the inner surface of the feed water pipe 10, that is, the surface of the carbon steel member, can be suppressed by the nickel metal film formed on the surface of the carbon steel member.

In the present embodiment, corrosion of the inner surface of the feed water pipe 10 can be suppressed by the nickel metal film during the nickel ferrite film formation, allowing iron (II) ions and nickel ions to be easily adhered on the inner surface of the feed water pipe 10, or to be more specific, on the surface of the nickel metal film. This can further shorten the time required for forming the nickel ferrite film of a predetermined thickness on the inner surface of the feed water pipe 10. The present embodiment can shorten the total of the time required for forming this nickel ferrite film and the time required for forming the above nickel metal film, to less than the time required for forming the nickel ferrite film of a predetermined thickness by the method of Japanese Patent Laid-open No. 2007-182604, in which no nickel metal film is formed.

The nickel ferrite film, which is more closely-packed than the nickel metal film, has a greater effect in corrosion protection of a carbon steel member than the nickel metal film. In the present embodiment, in which two corrosion protection films including the nickel ferrite film and the nickel metal film are formed on the inner surface of the feed water pipe 10, corrosion of the inner surface of the feed water pipe 10, which is the carbon steel member, between the valve 28 and the third stage low pressure feed water heater 8 can be significantly reduced during the operation of the BWR plant. In particular, the corrosion can be further reduced in a section where the nickel ferrite film covers the nickel metal film on the inner surface of the feed water pipe 10 between the valve 28 and the third stage low pressure feed water heater 8.

The iron (II) ions eluted into the film-forming aqueous solution from the feed water pipe 10 during the nickel metal film formation are used to form the nickel ferrite film on the surface of the nickel metal film. Because of this, the amount of the agent containing iron (II) ions and formic acid, injected by the iron (II) ion injection apparatus 85 during the nickel ferrite film formation into the film-forming aqueous solution flowing in the circulation pipe 35 can be reduced.

In the present embodiment, by forming the nickel metal film, the nickel ferrite film can be made thicker than that of when no nickel metal film is formed. For this reason, corrosion of the feed water pipe 10, which is the carbon steel member, can be further reduced according to the present embodiment.

In the present embodiment, the same kinds of hydrogen peroxide are used as oxidizing agent required for forming the nickel ferrite film and as oxidizing agent used for decomposing hydrazine and formic acid contained in the film-forming aqueous solution, so that the bath tank 46 for filling the oxidizing agent and the injection pump 44 for transporting the oxidizing agent can be shared. This allows the structure of the film formation apparatus 30 to be simplified.

In the present embodiment, no agent containing chlorine is used as the agent for forming the nickel ferrite film, so that the soundness of structural members of the BWR plant (for example, corrosion resistance) is not harmed. In order to reduce the amount of the agents used, it is preferable to separate and remove excess reaction products and to collect unreacted agents for reuse.

When the agent containing irons (II) ions and formic acid is to be injected into the film-forming aqueous solution containing nickel ions before the nickel metal film is formed on the entire inner surface of the feed water pipe 10, come into contact with the film-forming aqueous solution, hydrogen peroxide (the third agent) and hydrazine (the fourth agent) should be injected after the nickel metal film is formed on the entire inner surface described above.

In this case, there is a period in which the film-forming aqueous solution containing nickel ions and iron (II) ions is supplied into the feed water pipe 10 before the nickel metal film is formed on the entire inner surface of the feed water pipe 10, come into contact with the film forming solution. While the agent containing nickel ions and formic acid (the second agent) and the agent containing iron (II) ions and formic acid (the first agent) are each injected in this period, the pH of the film-forming aqueous solution is 4.0. When the agent containing iron (II) ions and formic acid is injected into the film-forming aqueous solution containing nickel ions before the nickel metal film is formed on the entire inner surface of the feed water pipe 10, come into contact with the film forming solution, as well, nickel ions in the film-forming aqueous solution capture electrons ($2e^-$) released from the inner surface of the feed water pipe 10 when iron (II) ions are eluted, and nickel metal is created. This nickel metal adheres on the inner surface of the feed water pipe 10, come into contact with the aqueous solution, thereby forming the nickel metal film on the inner surface of the feed water pipe 10.

Embodiment 2

A suppression method for corrosion of a carbon steel member according to Embodiment 2 which is another embodiment of the present invention, applied to a feed water pipe in a BWR plant is described below. In the suppression method for corrosion of a carbon steel member according to the present embodiment, the film formation apparatus 30 shown in FIG. 3 is used as well, and each procedure of the steps S1 to S10 performed in the embodiment 1 is carried on. While in the embodiment 1, the film formation apparatus 30 is removed from the feed water pipe 10 after the treatment in the step S9 is completed, in the present embodiment, the film formation apparatus 30 is removed from the feed water pipe 10 after the treatment in the step S10 is completed. That is, in the present embodiment, the treatment in the step S10 is performed during the shut down of the BWR plant operation. The BWR plant is started up after the treatment in the step S10 is completed and the film formation apparatus 30 is removed.

The treatment in the step S10 in the present embodiment is performed as follows. When the treatment in the step S10 is performed, the valves 36, 38, 41, 82, 50, 54, 59, 61, 63, and 65 are closed, and the rest of the valves are opened. After the waste solution treatment in the step S9 is completed, water is actually present in the feed water pipe 10 to which the film formation apparatus 30 are connected. At the time of completion of the treatment in the step S9, liquid in the circulation pipe 35 does not actually contain any agent, but is water. The circulation pumps 32 and 48 are driven, and the water is circulated in the circulation pipe 35 and the feed water pipe 10. This water is heated by the heater 53 to, for example, 160° C. Hydrogen peroxide is injected to the water flowing in the circulation pipe 35 from the bath tank 46 so that the dissolved-oxygen concentration of the water becomes 20 ppb. Water including the dissolved-oxygen at 160° C. is supplied to the feed water pipe 10. This transforms the nickel metal film formed on the inner surface of the feed water pipe 10 between the valve 28 and the connection point of the feed water pipe 10 and the branch pipe to which the circulation pipe 35 is connected, into a nickel ferrite film.

In the present embodiment, the heater 53 has a capacity to heat water to 160° C., and equipment and piping composing the film formation apparatus 30, such as the circulation pipe 35, have a pressure resistant structure to tolerate pressure for achieving the temperature of 160° C.

In the present embodiment, each effect attained in the embodiment 1 can be obtained except for the effect obtained by the hydrothermal treatment in the step S10 during the operation of the BWR plant.

Embodiment 3

Figure 11:
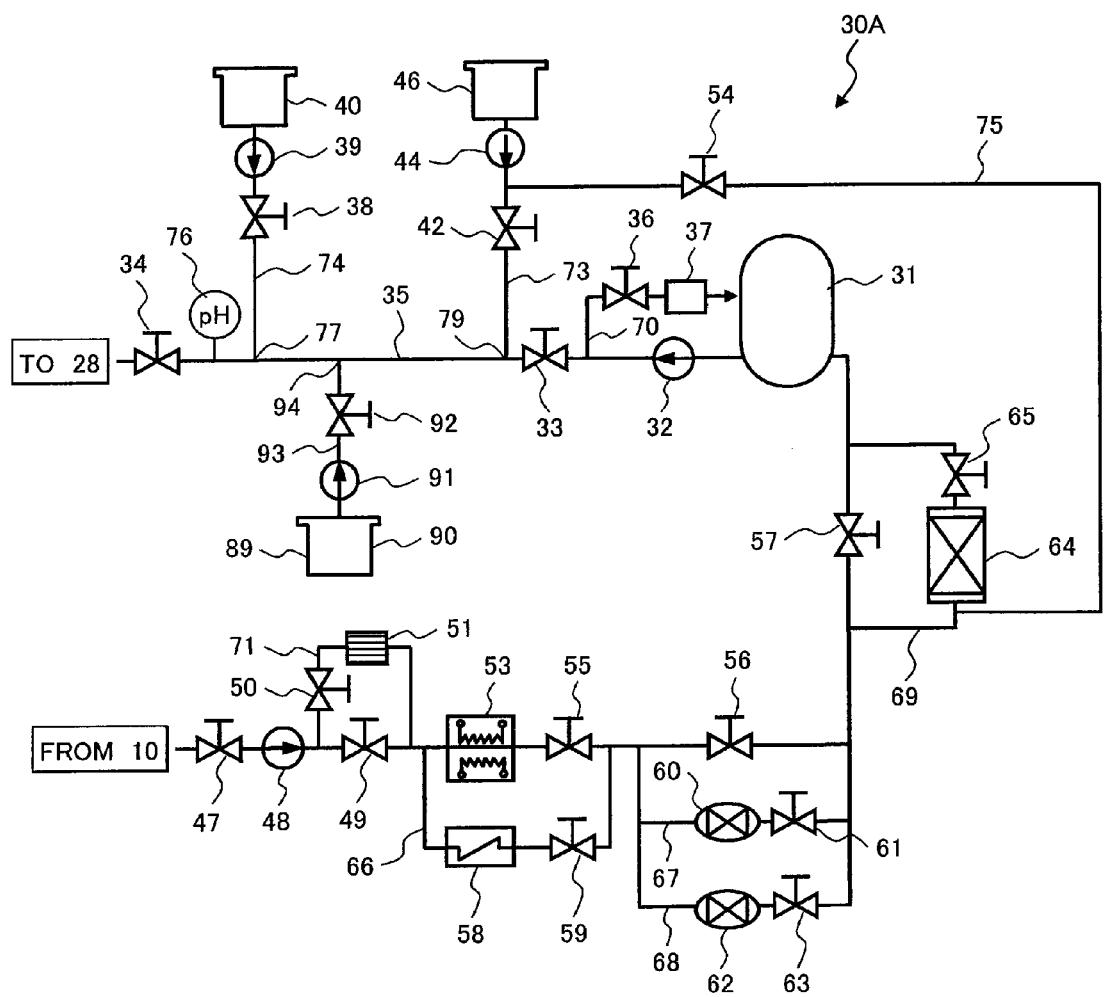
FIG. 11 is a structural diagram of a film formation apparatus used in a suppression method for corrosion of a carbon steel member according to Embodiment 3 which is another embodiment of the present invention, applied to a feed water pipe in a BWR plant.

A suppression method for corrosion of a carbon steel member according to Embodiment 3 which is another embodiment of the present invention, applied to a feed water pipe in a BWR plant is described with reference to FIG. 11. In the present embodiment, a nickel metal film and a nickel ferrite film are formed on the inner surface of the feed water pipe 10 using a film formation apparatus 30A shown in FIG. 11 in place of the film formation apparatus 30 used in the embodiment 1.

The film formation apparatus 30A has an injection apparatus 89, into which the iron (II) ion injection apparatus 85 and the nickel ion injection apparatus 88 in the film formation apparatus 30 are unified. The other components of the film formation apparatus 30A are the same as the film formation apparatus 30. The injection apparatus 89 has a bath tank 90, an injection pump 91, and an injection pipe 93. The bath tank 90 is connected to the circulation pipe 35 through the injection pipe 93 having the injection pump 91 and a valve 92. A connection point 94 of the injection pipe 93 and the circulation pipe 35 is disposed between the first connection point 77 and the fourth connection point 79. The bath tank 90 is provided with a bubbling apparatus (or an exhaust apparatus for the bath tank 90) of inert gas (for example, nitrogen gas) to prevent oxidation of agents.

In the present embodiment, a bath containing iron (II) ions and formic acid (the first agent) and a bath containing nickel ions and formic acid (the second agent) are each made in a non-radiation management zone (for example, a factory) outside a radiation management zone, and these bathes are mixed in advance to create a new bath (a fifth agent) containing ferrous (II) ions, nickel ions, and formic acid in the non-radiation management zone. A transport container storing this bath is transported to the turbine building where the film formation apparatus 30A is disposed. Both ends of the circulation pipe 35 of the film formation apparatus 30A are connected to the feed water pipe 10, which is the film-forming target, in the same manner as in the embodiment 1. The bath tank 90 is filled with the bath containing iron (II) ions, nickel ions, and formic acid, transported by using the transport container from the non-radiation management zone.

The suppression method for corrosion of a carbon steel member according to the present embodiment, using the film formation apparatus 30A is described. In the present embodiment, each operation in the steps S1 to S3 and steps S6 to S10 shown in FIG. 1 is performed. Each procedure in the steps S1 to S3 and S6 to S9 is performed during the shut down of the BWR plant operation. The step S10 is performed during the operation of the BWR plant. Between the steps S3 and S6, the bath containing iron (II) ions, nickel ions, and formic acid in the bath tank 90 is injected into the circulation pipe 35. The injection of this bath (the fifth agent) is done by opening the valve 92 and driving the injection pump 91 after the operation in the step S3 is completed. When the injection pump 91 is started, the bath containing iron (II) ions, nickel ions, and formic acid is injected from the bath bank 90 through the injection pipe 93 into the film-forming aqueous solution (which is water when the fifth agent is first injected) at a predetermined temperature (for example, 75° C.), flowing in the circulation pipe 35. This film-forming aqueous solution containing iron (II) ions, nickel ions, and formic acid is supplied into the film-forming target region in the feed water pipe 10 through the circulation pipe 35. A nickel metal film is formed on the inner surface of the feed water pipe 10 in the same manner as in the embodiment 1. In the present embodiment, the steps S4 and S5 in the embodiment 1 are simultaneously performed.

After that, the operations of the steps S6 and S7 are performed to supply the film-forming aqueous solution containing iron (II) ions, nickel ions, and hydrogen peroxide, having a pH of 7.0, into the feed water pipe 10 in the same manner as in the embodiment 1. Because of this, a nickel ferrite film is formed on the surface of the nickel metal film formed in the feed water pipe 10. In the present embodiment, oxidizing agent and a pH adjustment agent are added to the film-forming aqueous solution after the nickel metal film is formed on the entire inner surface of the feed water pipe 10, come into contact with the film-forming aqueous solution, so that a double-layer including the nickel metal film and nickel ferrite film can be formed on the inner surface of the feed water pipe 10 between the valve 28 and the connection point of the feed water pipe 10 and the branch pipe to which the circulation pipe 35 is connected.

After the procedure of the step S9 is completed and the operation of the BWR plant is started, the treatment in the step S10 is performed in the same manner as in the embodiment 1 to transform the nickel metal film formed on the inner surface of the feed water pipe 10 between the second stage high pressure feed water heater 9 and the connection point of the feed water pipe 10 and the branch pipe to which the circulation pipe 35 is connected, into the nickel ferrite film.

In the present embodiment, each effect attained in the embodiment 1 can be obtained. Since the injection apparatus 89 for injecting iron (II) ions and nickel ions is used in the present embodiment, the structure of the film formation apparatus 30A can be made simpler than the film formation apparatus 30, allowing the film forming procedures to be simpler than the embodiment 1 as well.

Embodiment 4

Figure 12:
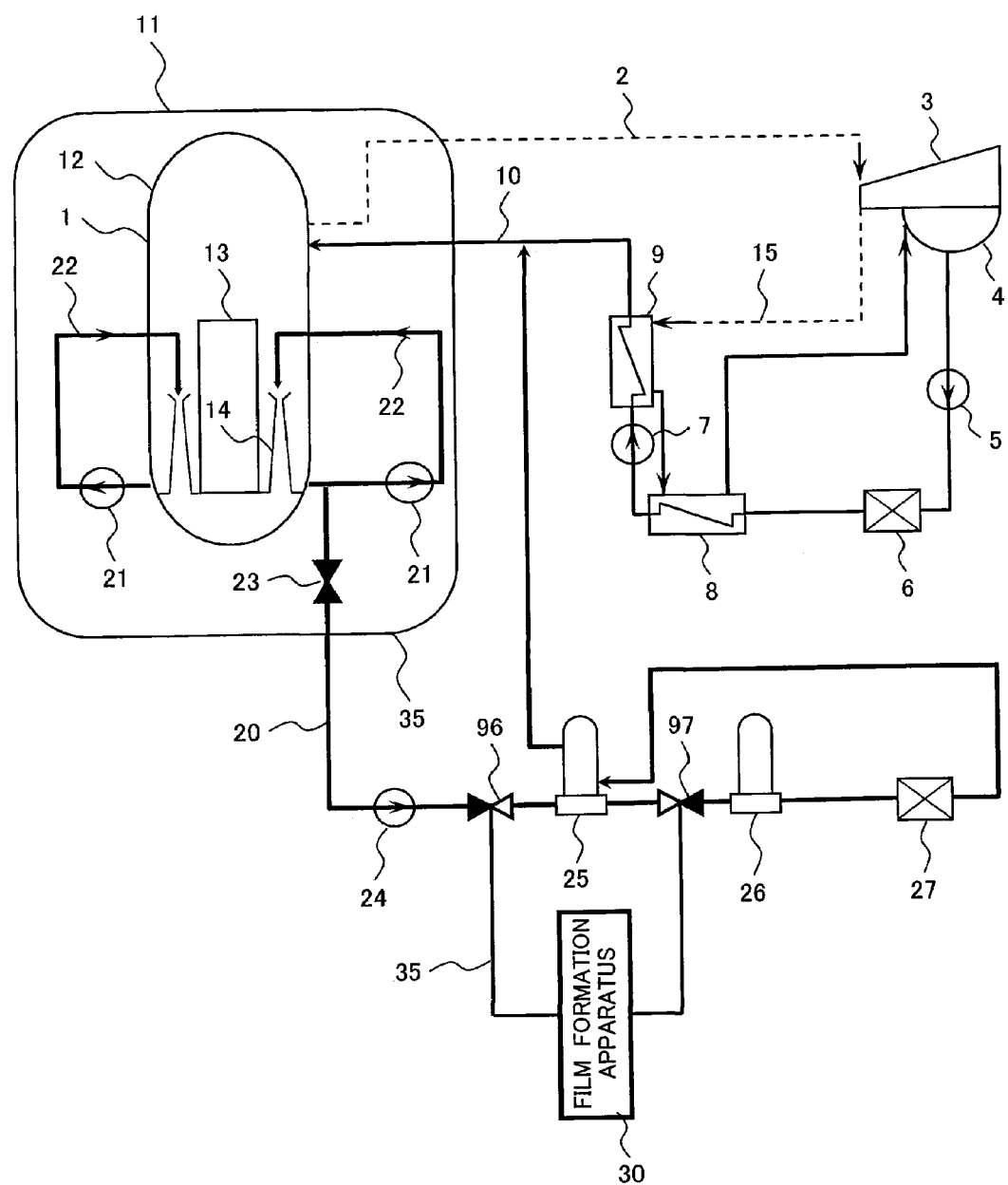
FIG. 12 is an explanatory drawing showing a status in which a film formation apparatus is connected to a clean-up pipe of a BWR plant in a suppression method for corrosion of a carbon steel member according to Embodiment 4 which is another embodiment of the present invention, applied to the clean-up pipe in the BWR plant.

A suppression method for corrosion of a carbon steel member according to Embodiment 4 which is another embodiment of the present invention, applied to a clean-up pipe 20 in a BWR plant, is described below with reference to FIG. 12. In a reactor clean-up system, a concern of corrosion arises in the regenerative heat exchanger 25, into which high-temperature cooling water is supplied from the RPV 12. Valves 96 and 97 are provided to the clean-up pipe 20 upstream and downstream of the regenerative heat exchanger 25 made of carbon steel.

While operation of the BWR plant is being shut down, a bonnet of the valve 96 is opened, and then, one end of the circulation pipe 35 of the film formation apparatus 30 is connected to a flange of the opened bonnet of the valve 96. The valve 23 provided to the clean-up pipe 20 is closed. A bonnet of the valve 97 is opened, and a flange of the non-regenerative heat exchanger 26 side is closed. The other end of the circulation pipe 35 of the film formation apparatus 30 is connected to a flange of the open bonnet of the valve 97. The film formation apparatus 30 is connected to the clean-up pipe 20 in this way to form a circulation passage for the film-forming aqueous solution using the clean-up pipe 20 and the circulation pipe 35.

In the present embodiment, each operation and treatment in the steps S1 to S9 in the embodiment 1 is performed as well. Consequently, a nickel metal film is formed on the inner surface of the regenerative heat exchanger 25 (the inner surface of a shell), come into contact with the film-forming aqueous solution, in the same manner as in the embodiment 1, and a nickel ferrite film is formed on the surface of the nickel metal film. The circulation pipe 35 is removed from the clean-up pipe 20 after the treatment in the step S9 is completed and while the operation of the BWR is being shut down.

After the circulation pipe 35 is removed from the clean-up pipe 20 and the operation of the BWR plant is started, the treatment in the step S10 is performed. After the operation of the BWR plant is started, cooling water in the RPV 12 is supplied into the clean-up pipe 20. The temperature of the cooling water in the RPV 12 becomes 150° C. or above in a temperature and pressure raising process. This cooling water in the RPV 12 contains dissolved-oxygen. Thus, the treatment in the step S10 can be performed.

The cooling water containing dissolved-oxygen supplied from the RPV 12 is introduced into the regenerative heat exchanger 25. In the temperature and pressure raising process, the temperature of the cooling water in the RPV 12 is increased up to about 288° C. The cooling water containing dissolved-oxygen at 150 to about 288° C. is supplied into the regenerative heat exchanger 25. The nickel metal film formed on the inner surface of the shell of the regenerative heat exchanger 25 is transformed into the nickel ferrite film, in the same manner as in the embodiment 1, by the action of the dissolved-oxygen contained in the cooling water at 150° C. or above. Because of this, a thick single-layer nickel ferrite film is formed on the inner surface of the shell. The nickel metal film is transformed into the nickel ferrite film during the temperature and pressure raising process and during a reactor power raising process after the temperature and pressure raising process.

In the present embodiment, each effect attained in the embodiment 1 can be obtained as well.

When no valve 97 is installed to the clean-up pipe 20 between the regenerative heat exchanger 25 and the non-regenerative heat exchanger 26, the other end of the circulation pipe 35 of the film formation apparatus 30 may be connected to a separation valve provided to the clean-up pipe 20 between the non-regenerative heat exchanger 26 and the reactor water clean-up apparatus 27.

In the present embodiment, the previously-describe film formation apparatus 30A may be used in place of the film formation apparatus 30.

Any one of the film formation apparatuses 30 and 30A may be connected to a carbon steel member in a BWR plant, such as a piping for a residual heat removal system, a reactor separation cooling system, a core spray system, an auxiliary equipment cooling water system, or a cooling water system using a cooling tower, to apply a corresponding method for forming a nickel ferrite film in one of the embodiments 1, 2, 3, and 4.

Furthermore, the suppression methods for corrosion of a carbon steel member in the embodiments 1, 2, and 3 can be applied not only to a feed water pipe in a BWR plant, but also to a feed water pipe made of carbon steel in a PWR plant and a thermal plant. In these cases, one of the film formation apparatuses 30 and 30A is connected to the feed water pipe of the applicable plant. A reactor in a BWR plant, to which a feed water pipe is connected; a steam generator in a PWR plant, to which a feed water pipe is connected; and a boiler in a thermal plant, to which a feed water pipe is connected, are a steam generation apparatus.

INDUSTRIAL APPLICABILITY

The present invention can be applied to a piping made of carbon steel in a nuclear power plant and a thermal power plant.

REFERENCE SIGNS LIST

1: nuclear reactor, 3: turbine, 4: condenser, 10: feed water pipe, 12: reactor pressure vessel, 30, 30A: film formation apparatus, 31: surge tank, 32, 48: circulation pump, 35: circulation pipe, 37: ejector, 39, 43, 44, 81, 91: injection pump, 40, 45, 46, 80, 90: bath tank, 51: filter, 53: heater, 58: cooler, 60: cation exchange resin tower, 62: mixed-bed resin tower, 64: decomposition apparatus, 72, 73, 74, 83, 93: injection pipe, 85: iron (II) ion injection apparatus, 86: oxidizing agent injection apparatus, 87: pH adjustment agent injection apparatus, 88: nickel ion injection apparatus, 89: injection apparatus, 98: oxygen supply apparatus.

What is claimed is:

1. A suppression method for corrosion of a carbon steel member, comprising steps of:
   connecting a pipe having a pump to a piping including the carbon steel member in a nuclear power plant;
   forming a nickel metal film on an inner surface of the piping by supplying a first film forming liquid containing nickel ions, whose pH is adjusted to a value in a range between 4.0 and 9.0, into the piping through the pipe;
   forming a nickel ferrite film on a surface of the nickel metal film formed on the inner surface of the piping by supplying a second film forming liquid including a first agent containing iron (II) ions, a second agent containing nickel ions, and a third agent for oxidizing the iron (II) ions, whose pH is adjusted by addition of a pH adjustment agent to a value within a range of more than 5.5 to 9.0 or less, into the piping through the pipe;
   removing the pipe from the piping after the formation of the nickel ferrite film; and
   after the formation of the nickel ferrite film, transforming the nickel metal film into a nickel ferrite film,
   wherein the steps of connecting the pipe, forming the nickel metal film, forming the nickel ferrite film, and removing the pipe are performed in a period when operation of the plant is being shut down, and the step of transforming the nickel metal film into the nickel ferrite film is performed when the plant is in operation.

2. The suppression method for corrosion of the carbon steel member according to claim 1, wherein the first film forming liquid contains ferrous (II) ions.

3. The suppression method for corrosion of the carbon steel member according to claim 1, wherein temperatures of the first and the second film forming liquids are adjusted to temperatures in a range from 60 to 100° C. by a heater provided to the pipe.

4. The suppression method for corrosion of the carbon steel member according to claim 1, wherein both ends of the pipe are communicated to the piping to form a closed loop with the pipe and the piping, and the first and the second film forming liquids are circulated in the closed loop.

5. The suppression method for corrosion of the carbon steel member according to claim 1, wherein the step of transforming the nickel metal film into the nickel ferrite film is performed by exposing the surface of the nickel ferrite film formed on the nickel metal film to water containing dissolved-oxygen at 150° C. or above.

6. The suppression method for corrosion of the carbon steel member according to claim 1,
wherein the nickel metal film is formed on an inner surface of a feed water pipe, which is the piping, connected to a steam generator for supplying feed water to the steam generator; and
wherein the transformation of the nickel metal film into a nickel ferrite film is performed by exposing the surface of the nickel ferrite film on the nickel metal film formed on the inner surface of the feed water pipe to the feed water containing dissolved-oxygen, whose temperature has become 150° C. or more by heating the feed water flowing in the feed water pipe using a plurality of feed water heaters provided to the feed water pipe.

7. The suppression method for corrosion of the carbon steel member according to claim 1,
wherein the nickel metal film is formed on an inner surface of a shell, which is the carbon steel member, of a heat exchanger provided to a clean-up pipe, which is the piping, connected to a reactor for supplying cooling water existing in the reactor to the heat exchanger; and
wherein the transformation of the nickel metal film into a nickel ferrite film is performed by exposing the surface of the nickel ferrite film on the nickel metal film formed on the inner surface of the shell to the cooling water containing dissolved-oxygen, whose temperature has become 150° C. or more in the reactor.

* * * * *